(12) United States Patent
Liao et al.

(10) Patent No.: US 9,772,396 B2
(45) Date of Patent: Sep. 26, 2017

(54) RELATIVE ORIENTATION ANGLE CALCULATION METHOD AND DEVICE AS WELL AS RELATIVE POSITIONING METHOD

(71) Applicants: Ke Liao, Beijing (CN); Bin Da, Beijing (CN); Wei Wang, Beijing (CN); Haihua Yu, Beijing (CN); Hong Yi, Beijing (CN)

(72) Inventors: Ke Liao, Beijing (CN); Bin Da, Beijing (CN); Wei Wang, Beijing (CN); Haihua Yu, Beijing (CN); Hong Yi, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/013,031

(22) Filed: Feb. 2, 2016

(65) Prior Publication Data
US 2016/0231415 A1    Aug. 11, 2016

(30) Foreign Application Priority Data
Feb. 9, 2015    (CN) .......................... 2015 1 0065579

(51) Int. Cl.
*H04Q 7/10*     (2006.01)
*G01S 5/02*     (2010.01)
*G01C 21/16*    (2006.01)

(52) U.S. Cl.
CPC .......... *G01S 5/0289* (2013.01); *G01C 21/165* (2013.01)

(58) Field of Classification Search
CPC .... G01B 21/22; H04W 4/027; H04M 1/6075; H04M 1/72572; H04M 1/72569; G01S 11/10; G10C 21/165
See application file for complete search history.

(56) References Cited

U.S. PATENT DOCUMENTS

| 2012/0086606 A1* | 4/2012 | Mathews | G01C 21/165 |
| | | | 342/461 |
| 2013/0102324 A1 | 4/2013 | Qiu et al. | |
| 2016/0187128 A1* | 6/2016 | Zhang | G01B 21/22 |
| | | | 702/150 |

FOREIGN PATENT DOCUMENTS

JP        04198787        7/1992

OTHER PUBLICATIONS

Japanese Office Action issued Feb. 21, 2017 for Japanese Application No. 2016-021159.

* cited by examiner

*Primary Examiner* — Kathy Wang-Hurst
*Assistant Examiner* — Julio Perez
(74) *Attorney, Agent, or Firm* — Harness, Dickey & Pierce, P.L.C.

(57) ABSTRACT

Disclosed is a relative orientation angle calculation method comprising steps of obtaining inertial sensor data of first and second mobile devices, the first mobile device being capable of sending a first signal to the second mobile device; obtaining a sending frequency that the first signal has when the first mobile device sends the first signal to the second mobile device; obtaining a receipt frequency that the first signal has when the second mobile device receives the first signal sent from the first mobile device, the first signal receiving influence of the Doppler effect in a sending process in which the first signal is sent to the second mobile device from the first mobile device; and calculating, based on the inertial sensor data, the sending frequency, and the receipt frequency, a relative orientation angle between the first and second mobile devices.

13 Claims, 11 Drawing Sheets

RELATIVE ORIENTATION ANGLE CALCULATION METHOD AND DEVICE AS WELL AS RELATIVE POSITIONING METHOD

BACKGROUND OF THE INVENTION

1. Field of the Invention

The present invention relates to the field of wireless communications, and particularly relates to a method and device for calculating a relative orientation angle as well as a relative positioning method.

2. Description of the Related Art

In general, the relative orientation angle between two mobile devices (e.g., first and second mobile devices) refers to the angle between the device orientation of one of the two mobile devices and the straight-line direction along the straight line from the one mobile device to another.

At present, in the conventional relative orientation angle calculation methods, first it is necessary to obtain the initial coordinates of the two mobile devices and their inertial sensor data on the basis of which the relative positions (coordinates) of the two mobile devices in a moving state are estimated, and then, the relative orientation angle between the two mobile devices may be determined by utilizing a positioning method such as the well-used triangulation approach.

For example, it is possible to carry out node (i.e., a mobile device) positioning and tracking in a network by sending a radio signal between the two mobile devices. However, when sending the radio signal, the two mobile devices may be in a moving state. As such, there may exist the Doppler effect between the two mobile devices. The Doppler effect may result in the change of the propagation distance of the radio signal between the two mobile devices, so that the receipt frequency of the radio signal is not accurate enough. In addition, if a process such as frequency based encoding is conducted by using the radio signal at the sending mobile device, then the Doppler effect may also result in a decoding error of the radio signal at the receipt mobile device.

Since the influence of the Doppler effect exists in various scenarios, in the conventional techniques, a process of compensating for the Doppler effect is conducted as needed in general. For example, the principle of the Doppler effect is usually adopted to compensate for the above-described inaccurate receipt frequency so as to more accurately carry out positioning with respect to a mobile device, so that it is possible to obtain the relevant relative orientation angle.

SUMMARY OF THE INVENTION

According to a first aspect of the present invention, a method of calculating a relative orientation angle is provided which includes:

an inertial data obtainment step of obtaining inertial sensor data of first and second mobile devices, the first mobile device being able to send a first signal to the second mobile device;

a sending frequency obtainment step of obtaining a sending frequency of the first signal when the first mobile device sends the first signal to the second mobile device;

a receipt frequency obtainment step of obtaining a receipt frequency of the first signal when the second mobile device receives the first signal sent from the first mobile device, the first signal receiving influence of the Doppler effect in a sending process in which the first signal is sent from the first mobile device to the second mobile device; and an orientation angle calculation step of calculating, based on the inertial sensor data, the sending frequency, and the receipt frequency, the relative orientation angle between the first and second mobile devices, the relative orientation angle being an angle between a device orientation of one of the two mobile devices and a straight-line direction along a straight line from the one mobile device to another.

According to a second aspect of the present invention, a relative positioning method of a mobile device is provided which includes:

a step of calculating, based on the method of calculating a relative orientation angle according to the first aspect of the present invention, an initial relative orientation angle between the first and second mobile devices;

a step of calculating an initial relative distance between the first and second mobile devices; and a step of determining, based on the initial relative orientation angle and the initial relative distance, an initial relative positional relation between the first and second mobile devices.

According to a third aspect of the present invention, a device for calculating a relative orientation angle is provided which includes:

an inertial sensor data obtainment part configured to obtain inertial sensor data of first and second mobile devices, the first mobile device being able to send a first signal to the second mobile device;

a sending frequency obtainment part configured to obtain a sending frequency of the first signal when the first mobile device sends the first signal to the second mobile device;

a receipt frequency obtainment part configured to obtain a receipt frequency of the first signal when the second mobile device receives the first signal sent from the first mobile device, the first signal receiving influence of the Doppler effect in a sending process in which the first signal is sent from the first mobile device to the second mobile device; and an orientation angle calculation part configured to calculate, based on the inertial sensor data, the sending frequency, and the receipt frequency, the relative orientation angle between the first and second mobile devices, the relative orientation angle being an angle between a device orientation of one of the two mobile devices and a straight-line direction along a straight line from the one mobile device to another.

Compared to the conventional techniques, by utilizing the method and device for calculating a relative orientation angle according to the embodiments of the present invention, it is possible to calculate, by using the inertial sensor data of at least two mobile devices and the Doppler effect whose influence is on the radio signal sent between them, the relative orientation angle between them. That is, by employing the calculation process of a relative orientation angle according to the embodiments, it is possible to achieve the relative orientation angle calculation on the basis of the Doppler effect and the inertial sensor data only between two mobile devices, i.e., it is not necessary to use an additional mobile device or to introduce other auxiliary parameters. As a result, the method and device for calculating a relative orientation angle according to the embodiments may directly utilize the influence of the Doppler effect on the radio signal sent between two mobile devices so as to obtain their relative positional information, without using any initial condition.

DETAILED DESCRIPTION OF THE PREFERRED EMBODIMENTS

Figure 1:
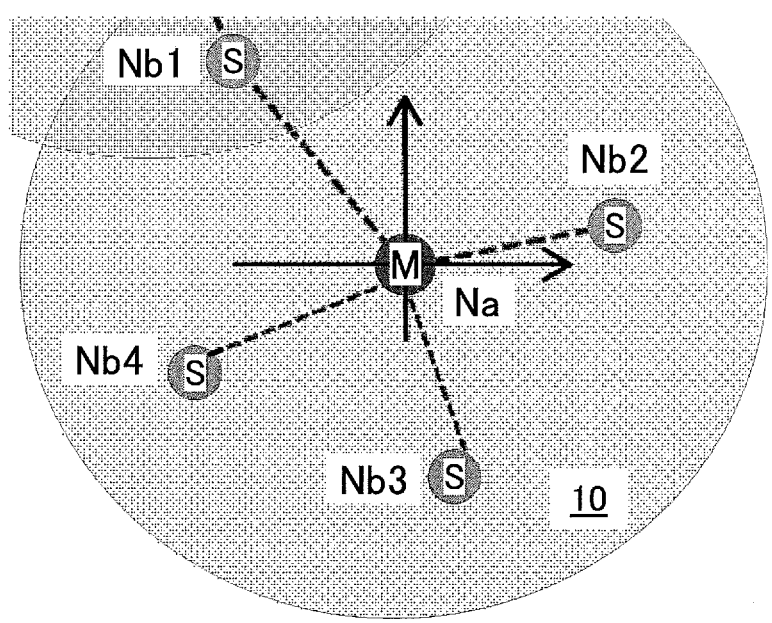
FIG. 1 illustrates an application scenario in which the present invention may be applied.

In order to let those people skilled in the art better understand the present invention, hereinafter the present invention will be concretely described on the basis of the drawings and various embodiments according to the following order:

1. Outline of Thought of Invention
2. Application Scenario
3. Relative Orientation Angle Calculation Method
4. Relative Positioning Method of Mobile Device
5. Example of Relative Positioning Method of Mobile Device
6. Relative Orientation Angle Calculation Device
7. Relative Positioning Apparatus
8. Mobile Device 1. Outline of Thought of Invention In the research for solving the technical problems existing in the conventional techniques, it has been found by the inventors that in most calculation processes of a relative orientation angle, the principle of the Doppler effect is adopted to compensate for the receipt frequency of a radio signal which is received by a mobile device on the receipt side (i.e., a receipt mobile device) from another mobile device on the sending side (i.e., a sending mobile device), so that it is possible to more accurately localize the two mobile devices so as to obtain the relevant relative orientation angle. That is, in the conventional techniques, the Doppler effect is regarded as a kind of bad influence which should be removed.

However, in the embodiments of the present invention, the inventors propose a new kind of relative orientation angle calculation method, as described below. Compared to the conventional techniques, it is possible to directly utilize the Doppler effect, that the radio signal sent between two mobile devices receives, to calculate the relative orientation angle between the two mobile devices, so that it is possible to turn the negative influence of the Doppler effect into a benefit.

2. Application Scenario

In what follow, an application scenario in which the embodiments of the present invention may be applied will be given by referring to FIG. 1.

The method and device for calculating a relative orientation angle as well as the relative positioning method and apparatus according to the embodiments of the present invention may be applied in a wireless communications system which is established in a specific environment.

For example, in a case where the specific environment is an outdoor environment, the wireless communications system may be a Global System for Mobile Communications (GSM) based one, a satellite based one, or a microwave based one. Again, for example, in a case where the specific environment is an indoor environment, the wireless communications system may be a Radio Frequency Identifier (RFID) based one, a ZigBee based one, an ultrasonic wave based one, an Ultra Wide Band (UWB) based one, a Bluetooth based one, a sound wave (audio wave) based one, or the like.

It is apparent that a relative orientation angle calculation method applied in the wireless communications system established in the outdoor environment cannot be applied in that established in the indoor environment because it cannot solve the problem of signal shielding in the indoor environment. In addition, since the techniques related to the wireless communications system established in the indoor environment are not well developed, and because the indoor environment is very complicated, when a conventional relative orientation angle calculation method is applied in the wireless communications system established in the indoor environment, generally there exists a problem that the calculation accuracy is relatively low, and the calculation time is relatively long.

For this reason, the method and device for calculating a relative orientation angle according to the embodiments of the present invention aim to further improve the calculation accuracy and to be better applied in the wireless communications system established in the indoor environment, so that it is possible to solve the above-described problem and to accurately estimate the relative orientation angle between two mobile devices therein so as to provide a good estimation result for accurately localizing the two mobile devices.

It should be noted that hereinafter although the wireless communications system established in the indoor environment is taken as an example for illustration, the present invention is not limited to this. That is, the present invention may also be applied to the wireless communications system established in the outdoor environment.

FIG. 1 illustrates an application scenario in which the present invention may be applied.

As shown in FIG. 1, the application scenario is a kind of indoor environment in which a wireless communications system 10 is established. The wireless communications system 10 may include at least two nodes.

As an example, what is shown in FIG. 1 is a kind of star topology based structure; that is, the wireless communications system 10 has a star topology based wireless network structure. In the example shown in FIG. 1, the wireless communications system 10 includes five nodes Na and Nb1 to Nb4. The node Na is a master node which may actively carry out a relative orientation angle calculation process in the wireless communications system 10. The nodes Nb1 to Nb4 are slave nodes which are passively involved in the relative orientation angle calculation process. Hereinafter, when it is not necessary to distinguish among the nodes Nb1 to Nb4, they may be called a "node Nb" for short.

In the wireless communications system 10, the roles of the master and slave nodes Na and Nb may change as the demand of relative orientation angle calculation changes. In addition, in the embodiments of the present invention, the relative orientation angle from the master Na to the slave node Nb refers to the angle between the master and slave nodes Na and Nb on the basis of the reference direction of the master node Na.

Particularly, in the wireless communications system 10, if the master Na and the slave node Nb1 are taken as an example, then it may be seen that wireless communications may be conducted between the two nodes such that it is possible to estimate the relative orientation angle between the two nodes in the indoor environment. For instance, in order to calculate the node distance between the master node Na and the slave node Nb1, the master node Na may send a radio signal to the slave node Nb1 so as to determine the inertial sensor data of the two nodes and the Doppler effect between them. After that, it is possible to conduct, in any one of the two nodes, the relative orientation angle calculation process on the basis of the inertial sensor data and the Doppler effect. Alternatively, the two nodes may transmit the relevant data to a server (not shown in the drawings) so as to let the server carry out the relative orientation angle calculation process.

3. Relative Orientation Angle Calculation Method

In what follows, a method of calculating a relative orientation angle according to an embodiment of the present invention will be described by referring to FIG. 2.

The method of calculating a relative orientation angle may be used for estimating the relative orientation angle between two mobile devices (e.g., first and second devices) in a specific environment.

In an example, the specific environment may be an indoor environment. Alternatively, in another example, the specific environment may be an outdoor environment.

Figure 2:
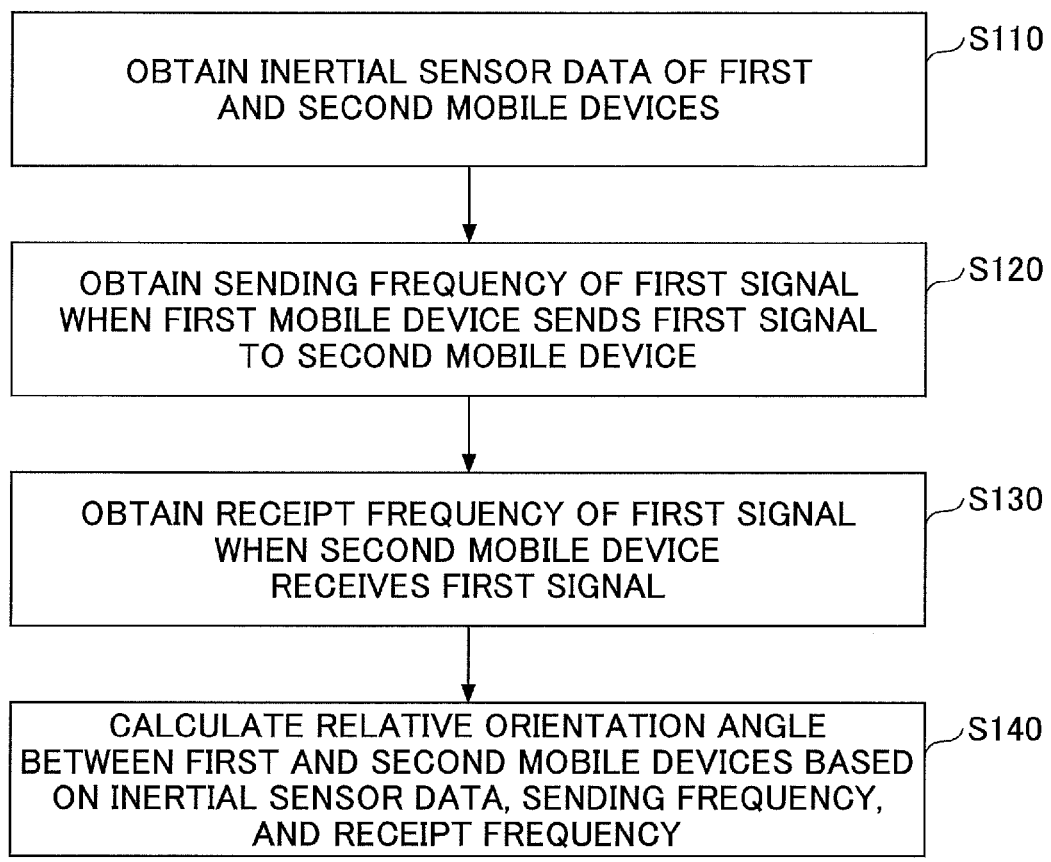
FIG. 2 is a flowchart of a method of calculating a relative orientation angle, according to an embodiment of the present invention.

FIG. 2 is a flowchart of the method of calculating a relative orientation angle, according to this embodiment.

As shown in FIG. 2, the method may include STEPS S110 to S140.

In STEP S110 of FIG. 2, the inertial sensor data of the first and second mobile devices is obtained. The first mobile device may send a first signal to the second mobile device.

In STEP S120 of FIG. 2, the sending frequency of the first signal when the first mobile device sends the first signal to the second mobile device is obtained.

In STEP S130 of FIG. 2, the receipt frequency of the first signal when the second mobile device receives the first signal sent from the first mobile device is obtained. The first signal is influenced by the Doppler effect in the process of sending the first signal from the first mobile device to the second mobile device.

In STEP S140 of FIG. 2, on the basis of the inertial sensor data, the sending frequency, and the receipt frequency, the relative orientation angle between the first and second mobile devices is calculated. The relative orientation angle is one between the device orientation of one the two mobile devices and the straight-line direction along the straight line passing the one mobile device and another.

Hereinafter, the respective steps will be illustrated in detail.

Different from the conventional techniques in which the principle of the Doppler effect is utilized to compensate for the receipt frequency of a radio signal, and on the basis of this, the relative orientation angle between two mobile devices is calculated, in the method of calculating a relative orientation angle according to this embodiment, it is possible to sufficiently take account of the influence of the Doppler effect on the process of sending the radio signal between the two mobile devices, and to utilize the Doppler effect and the inertial sensor data of the two mobile devices to directly calculate the relative orientation angle between them.

For this purpose, in an example, before STEP S110 in FIG. 2, it is possible to send the first signal from the first mobile device to the second mobile device.

The first signal may have any kind of waveform, for example, a sound signal (an audio signal) or a RF signal. In other words, as long as the Doppler effect may be generated due to the relative motion between the first and second mobile devices when the first signal is transmitted between them, it is okay. In particular, comprehensively considering the timing accuracy and the amount of calculation of the relative orientation angle in a mobile device, the first signal may be the sound signal.

Figure 3:
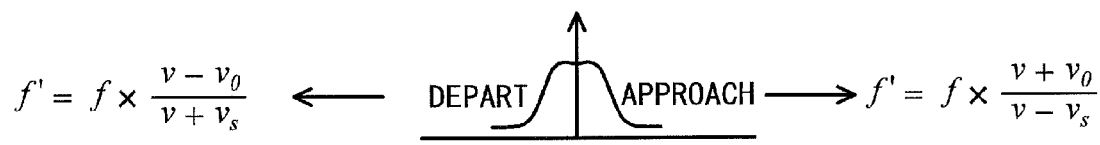
FIG. 3 illustrates the principle of the Doppler effect.

FIG. 3 illustrates the principle of the Doppler effect.

As shown in FIG. 3, on the basis of the Doppler effect, if the receipt frequency of the first signal at the second mobile device is higher than the sending frequency of the first signal at the first mobile device, that means the two mobile devices approach each other; on the other hand, if the receipt frequency is lower than the sending frequency, that means the two mobile devices depart from each other.

In particular, the frequency relation between the two mobile devices is as follows.

$$f' = \left(\frac{v \pm v_0}{v \mp v_s}\right)f \tag{1}$$

Here, f' refers to the receipt frequency of the first signal at the second mobile device; f refers to the sending frequency of the first signal at the first mobile device; v refers to the propagation velocity of the first signal in the propagation medium between the two mobile devices (e.g., when the first signal is the sound signal and the propagation medium is air, the propagation velocity is 340 m/s); $v_0$ refers to the moving velocity of the second mobile device (if the second mobile device is approaching the first mobile device, then the mathematical symbol before it is "+"; otherwise, the mathematical symbol before it is "−"); and $v_s$ refers to the moving velocity of the first mobile device (if the second mobile device is approaching the first mobile device, then the mathematical symbol before it is "−"; otherwise, the mathematical symbol before it is "+").

Next, in order to calculate the relative orientation angle between the first and second mobile devices, it is possible to obtain, in STEP S110 of FIG. 2, the inertial sensor data of the two mobile devices.

For example, the inertial sensor of each mobile device may be a kind of sensor able to detect and measure an acceleration, a tilt, a shock, a vibration, a rotation, and a multi-degree-of-freedom motion. It may include, for instance, an accelerometer (or an acceleration transducer), an angular transducer (or a gyroscope), an inertial measurement unit (IMU) using a combination of the accelerometer and the gyroscope (sometimes also a magnetometer), and an attitude and heading reference system (AHRS) including a magnetic sensor. Hence the inertial data of the inertial sensor in each mobile device may include, for example, the acceleration (in a very short time period, it is possible to estimate the corresponding velocity on the basis of the acceleration), the angular velocity, the attitude and heading, and the orientation angle of the corresponding mobile device itself. By utilizing this kind of inertial data, it is possible to grasp information such as the acceleration, the velocity, the angular velocity, the attitude and heading, and the orientation angle of each mobile device.

If it is assumed that the first mobile device actively conducts the calculation of the relative orientation angle, then the first mobile device may directly read the inertial data obtained by the inertial sensor installed in itself. In addition, the first mobile device may also get the inertial data obtained by the inertial sensor installed in the second mobile device from the second mobile device via, for instance, the wireless network between the two mobile devices. For example, the obtainment of the inertial sensor data between the two mobile devices may be conducted periodically or on the basis of a request-and-response mechanism.

After the first mobile device sends the first signal to the second mobile device, it is possible to acquire, in STEP S120 of FIG. 2, the sending frequency that the first signal has when the first mobile device sends the first signal to the second mobile device, i.e., the original sending frequency of the first signal at the first mobile device.

In like manner, after the second mobile device receives the first signal from the first mobile device, it is possible to obtain, in STEP S130 of FIG. 2, the receipt frequency that the first signal has when the second mobile device receives the first signal from the first mobile device, i.e., the receipt frequency of the first signal at the second mobile device after the first signal receives the influence of the Doppler effect in the sending process from the first mobile device to the second mobile device.

Eventually, after obtaining the inertial sensor data, the sending frequency, and the receipt frequency, it is possible to calculate, in STEP S140 of FIG. 2, the relative orientation angle between the first and second mobile devices.

As described above, the Doppler effect includes two types, namely, one is caused when the first and second mobile devices approach each other (hereinafter, called a "first type" for short), and another is caused when the two mobile devices depart from each other (hereinafter, called a "second type" for short). As such, in order to more accurately calculate the relative orientation angle, in an example, STEP S140 of FIG. 2 may include a determination step of determining, on the basis of the magnitude relation between the sending frequency and the receipt frequency (e.g., whether the sending frequency is higher or lower than the receipt frequency), the type of the Doppler effect; and a calculation step of, according to the type of the Doppler effect, calculating the relative orientation angle on the basis of the inertial data, the sending frequency, and the receipt frequency.

In particular, the calculation step includes steps of calculating, on the basis of the inertial sensor data, a first moving velocity component of the first mobile device in the straight-line direction along the straight line between the two mobile devices and a second moving velocity component of the second mobile device in the same direction; according to the type of Doppler effect (i.e., the first or second type), generating, on the basis of the first and second moving velocity components, a first relation between a first relative orientation angle of the first mobile device with regard to the second mobile device and a second relative orientation angle of the second mobile device with regard to the first mobile device; on the basis of a first device orientation of the first mobile device and a second device orientation of the second mobile device, generating a second relation between the first and second relative orientation angles; and on the basis of the first and second relations, calculating the first relative orientation angle and/or the second relative orientation angle.

It can be seen from the above that, by utilizing the method of calculating a relative orientation angle according to this embodiment, it is possible to use both the inertial sensor data of at least two mobile devices and the Doppler effect that the radio signal sent between them receives, so as to calculate the relative orientation angle between them. That is, according to the method of calculating a relative orientation angle according to this embodiment, it is possible to achieve the relative orientation angle calculation only between two mobile devices, without utilizing an additional mobile device or introducing other assistance parameters. As a result, by utilizing the method of calculating a relative orientation angle according to this embodiment, it is possible to directly employ the Doppler effect that the radio signal sent between two mobile devices receives, so as to determine the relative orientation angle between the two mobile devices, without using any initial condition.

Here it should be noted that although the method of calculating a relative orientation angle according to this embodiment has been depicted according to the specific order of STEP S110 to STEP S140 in FIG. 2, the present invention is not limited to this. For example, the step of obtaining the inertial sensor data (i.e., STEP S110 of FIG. 2) may be conducted after the steps of obtaining the sending and receipt frequencies (i.e., STEPS S120 and S130 of FIG. 2), or these three steps may be carried out in parallel.

4. Relative Positioning Method of Mobile Device

After calculating the relative orientation angle between the first and second mobile devices, the calculation result may be applied to many application scenarios. For example, if it is possible to further acquire the relative distance between the two mobile devices, then it is possible to realize, on the basis of the relative orientation angle and the relative distance, the relative positioning of the two devices.

Figure 4:
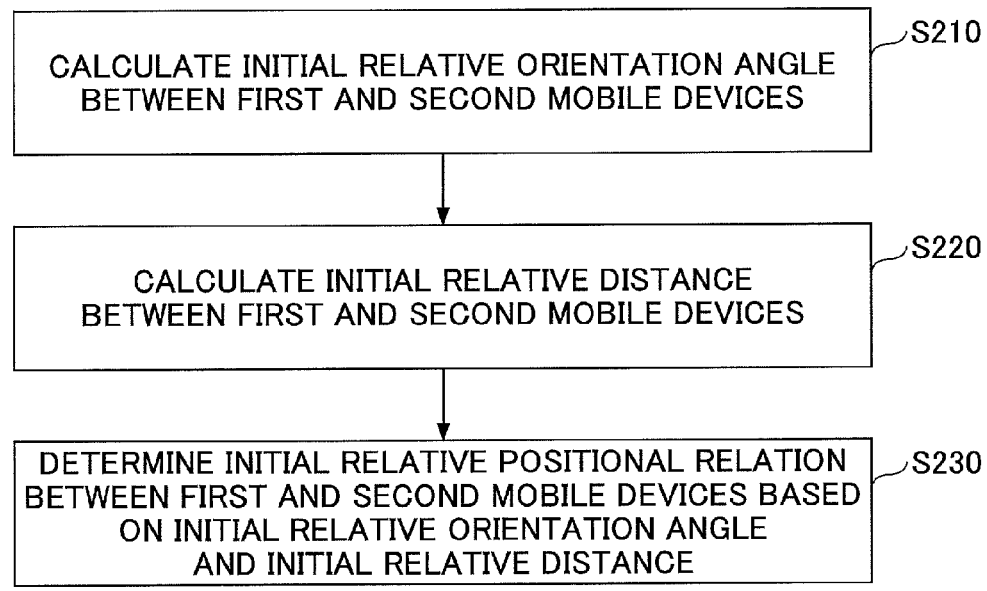
FIG. 4 is a flowchart of a relative positioning method of a mobile device, according to an embodiment of the present invention.

In what follows, a relative positioning method of a mobile device, according to an embodiment of the present invention will be illustrated by referring to FIG. 4.

The relative positioning method according to this embodiment may be used to carry out relative positioning with respect to a mobile device whose position is unknown in a specific environment. The relative positioning method is a new concept proposed with regard to the conventional absolute positioning method. The absolute positioning method is also called a "one point localization method". It is a kind of localization method in which only one mobile device is adopted to conduct localization, and what it determines are the absolute coordinates of the mobile device. The characteristic of the absolute positioning method is that its operation (process) is simple, and only one mobile device is needed. However, since its accuracy is not high enough, the absolute positioning method is suitable for being utilized in an application such as navigation that does not need high accuracy. To the contrary, the relative positioning method according to this embodiment is also called a "difference localization method". It is a kind of localization method in which two or more mobile devices are adopted to determine the relative positional relation of the mobile devices. That is, the relative positioning method cannot obtain the absolute coordinates of the mobile devices, but can only obtain the positional relation between two mobile devices.

FIG. 4 is a flowchart of the relative positioning method of a mobile device, according to this embodiment.

As shown in FIG. 4, the relative positioning method of a mobile device includes STEPS S210 to S230.

In STEP S210 of FIG. 4, the initial relative orientation angle between two mobile devices (i.e., the first and second mobile devices) is calculated.

In STEP S220 of FIG. 4, the initial relative distance between the first and second mobile devices is calculated.

In STEP S230 of FIG. 4, on the basis of the initial relative orientation angle and the initial relative distance, the initial relative positional relation between the first and second mobile devices is determined.

Hereinafter, the respective steps will be illustrated in detail.

In STEP S210 of FIG. 4, it is possible to utilize various relative orientation angle calculation methods to calculate the relative orientation angle between the first and second mobile devices so as to serve as the initial relative orientation angle.

In an example, it is possible to use the method of calculating a relative orientation angle, according to the above embodiment to calculate the initial relative orientation angle between the first and second mobile devices.

In order to finally obtain the initial relative positional relation between the first and second mobile devices, it is possible to use, in STEP S220 of FIG. 4, various relative distance calculation methods to calculate the relative distance between the two mobile devices so as to serve as the initial relative distance.

At present, the well-used relative distance calculation techniques mainly include a received signal strength indicator (RSSI) based distance measurement technique, a time of flight (TOF) based distance measurement technique, a time difference of arrival (TDOA) based technique (distance measurement or localization), an angle of arrival (AOA) based distance measurement technique, a phase of arrival (POA) based distance measurement technique, etc.

The main idea of the RSSI based distance measurement technique is that the distance estimation between any two nodes is realized on the basis of the received signal strength of a radio signal. At present, this kind of technique is adopted in most wireless communications systems, for example, Wi-Fi, Bluetooth low energy (BLE), Zigbee, and ultra-wide band based communications systems. Since this kind of technique is convenient, it has been widely used in supermarkets, libraries, etc. However, the received signal strength of a radio signal, serving as the foundation of the distance measurement is very easily affected by the relevant environment.

The main idea of the TOF based distance measurement technique is that the distance estimation between any two nodes is achieved on the basis of the propagation time of a radio signal. In particular, in this kind of technique, a sending node sends a signal; then a receipt node receives the signal; and then, the propagation time of the signal from the sending node to the receipt node is measured. The accuracy of this kind of technique depends on the synchronization accuracy of the relevant wireless network and the timing accuracy of the receipt node. The signal sent may include, for example, a RF signal or a sound signal. In addition, this kind of technique needs the relevant wireless network to conduct synchronous transmission of data. As such, in actual applications, it may also be replaced by the following TDOA based technique.

The TDOA based technique includes TDOA based distance measurement and TDOA based localization. The TDOA based distance measurement is utilizing the time difference of arrival between two different signals so as to calculate the distance between two nodes. For example, the signals may include a radio frequency (RF) signal and a ultrasonic signal. The TDOA based localization is adopting the time difference of arrival of a signal sent to two receipt nodes so as to determine the position of the sending node. This kind of technique does not need the relevant wireless network to carry out synchronization, so it is convenient, and its accuracy is high. As such, it has been widely utilized in the indoor environment, particularly, in a laboratory, etc. However, since the radio signal is very easily influenced by the relevant environment, this kind of technique is still in the research stage.

The main idea of the AOA based distance measurement technique is conducting distance measurement on the basis of the angle of arrival of a radio signal sent to two receipt nodes. The accuracy of this kind of technique is high. However, since it is difficult to design an antenna array for measuring the angle of arrival of the radio signal, this kind of technique is also still in the research stage.

In addition, the main idea of the POA based distance measurement is carrying out distance measurement on the basis of the phase difference between two different signals. Since this kind of technique does not rely on the accuracy of a timer, it has a relatively high distance measurement accuracy. The signals may be, for example, two ones whose phases are different. This kind of technique has been applied in the actual products.

Hereinafter, a process of calculating the initial relative distance between the two mobile devices will be depicted by taking the TOF based distance measurement technique as an example.

In a first example, STEP S220 of FIG. 4 may include obtaining a sending end time point at which the first mobile device finishes the sending of the first signal; obtaining a receipt start time point at which the second mobile device starts to receive the first signal; obtaining a processing time delay when the second mobile device processes the first signal; and calculating, on the basis of the sending end time point, the receipt start time point, the processing time delay, and the propagation velocity of the first signal, the initial relative distance.

In particular, the first signal may be one able to receive the influence of the Doppler effect, sent from the first mobile device to the second mobile device for realizing the relative orientation angle calculation method. For example, the first signal may be a sound signal sent from the first mobile device to the second mobile device. It may include an audible sound wave whose frequency is between 20 Hz to 20,000 Hz, an infrasonic wave whose frequency is less than 20 Hz, and/or an ultrasonic wave whose frequency is greater than 20,000 Hz.

For instance, in order to obtain the propagation time of the first signal between the two mobile devices, it is possible to obtain, after the first mobile device sends the first signal to the second mobile device for calculating the relative orientation angle between the two mobile devices, the sending end time point of the first signal at the first mobile device. And then, when the first signal arrives at the second mobile device, it is possible to obtain the receipt start time point of the first signal at the second mobile device. After that, it is possible to let the time difference between the sending end time point and the receipt start time point of the first signal serve as the propagation time of the first signal between the two mobile devices.

However, on the one hand, the sending end time point is known only by the first mobile device, and the receipt start time is known only by the second mobile device. As such, in order to calculate the relative distance between the two mobile devices, it is necessary to conduct time information synchronization between the two mobile devices. This may undoubtedly increase the burden of the two mobile devices. On the other hand, more important is that since the first signal may be affected by the Doppler effect between the two mobile devices, the receipt frequency of the first signal received by the second mobile device may be incorrect (i.e., have an error), so that the receipt start time point of the first signal is incorrect. As such, it is necessary to utilize the principle of the Doppler effect to compensate for this kind of incorrect receipt start time point so as to correct the propagation time of the first signal, so that it is possible to get, when measuring the relative distance between the two mobile devices by utilizing a TDOA based algorithm, a more accurate result. Unfortunately, as described in the background of the present invention, when carrying out this kind of compensation, sometimes it is impossible to accurately determine a value for compensating for the receipt frequency, thereby negatively affecting the accuracy of the relative orientation angle calculation result.

In order to solve this problem, in a second example, instead of obtaining the receipt start time point of the first signal at the second mobile device, it is possible to cause the second mobile device to send, after it receives the first signal, a second signal to the first mobile device, and then to cause the first mobile device to obtain the receipt start time point of the second signal at the first mobile device. After that, it is possible to utilize the sending end time point of the first signal at the first mobile device and the receipt start time point of the second signal at the first mobile device so as to estimate the propagation time of the first signal between the two mobile devices.

In this case, STEP S220 of FIG. 4 may include obtaining a sending end time point at which the first mobile device finishes sending the first signal; obtaining a receipt start time point at which the first mobile device starts receiving the second signal which is one sent by the second mobile device to the first mobile device after the second mobile device receives the first signal; obtaining a processing time delay generated when the second mobile device processes the first signal, then generates the second signal on the basis of the processing result, and then sends the second signal; and calculating, on the basis of at least the sending end time point, the receipt start time point, the processing time delay, and the propagation velocities of the first and second signals, the initial relative distance.

In particular, the second signal may be any type of signal, for example, a sound signal, a RF signal, or an optical signal.

Furthermore, the second signal may have the same type of the first signal. For example, the first and second signals may be a same kind of sound signal. At this time, the time difference between the sending end time point of the first signal at the first mobile device and the receipt start time point of the second signal at the first mobile device may include both 2 times the propagation time of the first signal between the two mobile devices and the processing time delay generated when the second mobile device processes the first signal, then generates the second signal on the basis of the processing result, and then sends the second signal. As such, by subtracting the processing time delay from the time difference, and then dividing the calculation result by 2, it is possible to obtain the propagation time of the first signal between the two mobile devices.

Alternatively, in order to speed up the calculation process of the relative distance, the type of the second signal may be different from the type of the first signal. For example, the second signal may be a RF signal. At this time, since the propagation velocity of the second signal is very high, the propagation time of the second signal between the two mobile devices may be ignored. As such, the time difference between the sending end time point of the first signal at the first mobile device and the receipt start time of the second signal at the first mobile device may include both the propagation time of the first signal between the two mobile devices and the processing time delay generated when the second mobile device processes the first signal, then generates the second signal on the basis of the processing result, and then sends the second signal. As such, by subtracting the processing time delay from the time difference, it is possible to obtain the propagation time of the first signal between the two mobile devices.

Moreover, the second signal may also be a RF signal which includes the data of the physical layer among the seven layers of the Open Systems Interconnection (OSI). In this way, since the physical layer data does not need complicated upper layer protocol processing (e.g., a capsulation or decapsulation (routing) process), the relevant processing speed is very high, and the relevant processing time delay may be ignored in this case. As such, the time difference between the sending end time point of the first signal at the first mobile device and the receipt start time point of the second signal at the first mobile device may include both the propagation time of the first signal between the two mobile devices and the processing time delay generated when the second mobile device processes the first signal. As such, by subtracting the processing time delay from the time difference, it is possible to obtain the propagation time of the first signal between the two mobile devices.

Here it should be noted that up to here, the relative orientation angle calculation method and the relative positioning method according to the embodiments of the present invention have been described on the basis of a simple case where the wireless system 10 shown in FIG. 1 includes only the first and second mobile devices. However, actually the wireless system 10 may include more mobile devices, as shown in FIG. 1. In this case, a receipt mobile device may receive signals sent by plural sending mobile devices, so that interference may occur.

Regarding this case, it is possible to adopt the following step, namely, when sending the first signal or the first and second signals between the first and second mobile devices in order to achieve the relative orientation angle calculation method and the relative positioning method, letting the first and second signals carry the IDs of the first and second mobile devices, respectively. For example, when the first mobile device broadcasts the first signal, it is possible to let the first signal carry the ID of the sending mobile device (i.e., the first mobile device). Additionally, if the first signal is sent in a unicast or multicast manner (i.e., is not broadcasted), then it is also possible to let the first signal further carry the ID of the receipt mobile device (i.e., the second mobile device). On the other hand, when the second mobile device sends the second signal to the first mobile device, it is also possible to let the second signal carry both the ID of the sending mobile device (i.e., the second mobile device) and the ID of the receipt mobile device (i.e., the first mobile device).

More particularly, in order to carry the ID of the relevant mobile device, the first signal may include the ID of the first mobile device, which is indicated by the different changes of plural sending frequencies, and the second signal may include the IDs of the first and second mobile devices, which are indicated by the different changes of plural sending frequencies.

In this way, by utilizing the IDs included in the first and second signals, the receipt mobile device (e.g., the second mobile device) may recognize the signal sent from a specific sending mobile device (e.g., the first mobile device) among the plural signals that the receipt mobile device receives at the same time, so that the interference may be avoided.

In this case, a sub step of obtaining the receipt start time point of the second signal at the first mobile device in STEP S220 of FIG. 4 may include obtaining the receipt start time point in response to determining that the ID information analyzed by the first mobile device from the second signal includes the ID of the first mobile device.

And then, after obtaining the initial relative orientation angle and the initial relative distance between the first and second mobile devices, in STEP S230 of FIG. 4, it is possible to determine, on the basis of the initial relative orientation angle and the initial relative distance, the initial relative positional relation between the first and second mobile devices, i.e., the distance and direction of the second mobile device relative to the first mobile device.

In the above-described steps of the relative positioning method according to this embodiment, it is necessary to send and receive a signal(s) between the two mobile devices. It is apparent that this kind of signal transmission process may consume a large amount of power, and may be easily affected by the interference due to the relevant environment. In order to reduce the power consumption and to extend the standby time of the relevant mobile device, it is also possible to, instead of continuously sending and receiving a signal(s) between the first and second mobile devices, use the inertial sensor data of the two mobile devices to track the relative positions of the two mobile devices, after conducting relative positioning with respect to the two mobile devices.

For this purpose, in an example, after STEP S230 of FIG. 4, the relative positioning method may further include re-obtaining, after determining the initial positional relation, the inertial sensor data of the first and second mobile devices, and then calculating the updated relative orientation angle between the two mobile devices on the basis of the re-obtained inertial sensor data; calculating the updated relative distance between the first and second mobile devices on the basis of the initial relative distance and the re-obtained inertial sensor data; and estimating the updated relative positional relation between the first and second mobile devices on the basis of the updated relative orientation angle and the updated relative distance.

In this way, by utilizing the inertial sensor data, for example, the acceleration (and the corresponding velocity obtained on the basis of the acceleration), the angular velocity, and the attitude and heading, it is possible to know the current moving trend of the first and second mobile devices so as to track the possible relative positions of the two mobile devices in the next predetermined period of time.

Of course, after tracking a certain period of time, an error may occur between the tracked position and the actual position. At this time, it is also possible to re-determine the current relative positions of the two mobile devices by utilizing the above-described relative orientation angle calculation process, the relative distance determination process, and the relative positioning process.

As a result, in an example, the relative positioning method may further include calculating, after estimating the updated relative positional relation, the accumulated error related to the updated relative positional relation; determining whether the accumulated error is greater than or equal to a predetermined threshold value; and re-calculating, in response of determining that the accumulated error is greater than and equal to the predetermined threshold, the initial relative orientation angle and the initial relative distance between the first and second mobile devices.

Therefore it can been seen from the above that by utilizing the relative positioning method according to this embodiment, it is possible to achieve a kind of relative positioning process in an unknown environment. That is, a mobile device itself may meet a relative positioning need between itself and one or other mobile devices, without utilizing any beacon node. In addition, by utilizing the relative positioning method according to this embodiment, it is also possible to track mobile devices, with respect to which relative positioning has been conducted, on the basis of their inertial sensor data, so as to satisfy the demand of real-time relative positioning together with low power consumption.

5. Example of Relative Positioning Method of Mobile Device

In what follows, an example of the relative positioning method according to the above embodiment will be given by referring to FIGS. 5 to 12.

In this example, it is assumed that the relative positioning method is applied in an application scenario such as a technical forum or a trade fair where people need to communicate with each other face to face, the purpose of a visitor (or called a "user") is to find a person sharing the same interest and to communicate with him/her face to face, so that it may be possible to, for example, catch a business opportunity. However, it is difficult for the user to find such a person among a huge number of persons. Moreover, even in a case where the user knows that there is such a person, it is also difficult to determine where he/she is. At present, most indoor localization methods need to pre-deploy a beacon node(s) or special device(s). This is undoubtedly very troublesome, and cannot obtain a good user experience.

For this reason, the purpose of the embodiments of the present invention is to obtain the relative positional information of the mobile devices in a wireless network without utilizing any pre-deployed beacon node or special device; for example, it is possible to obtain, by using only one mobile device, the positional information of one or more other mobile devices. That is, by using only the mobile device of a user, it is possible to achieve a relative positioning function with respect to a nearby person of interest, so that the user may conveniently find him/her. In other words, it is possible to obtain the relative positional information (i.e., the relative orientation angle and the relative distance) between any two persons sharing the same interest.

Hereinafter, a flowchart of the example of the relative position method will be described by referring to FIG. 5.

Figure 5:
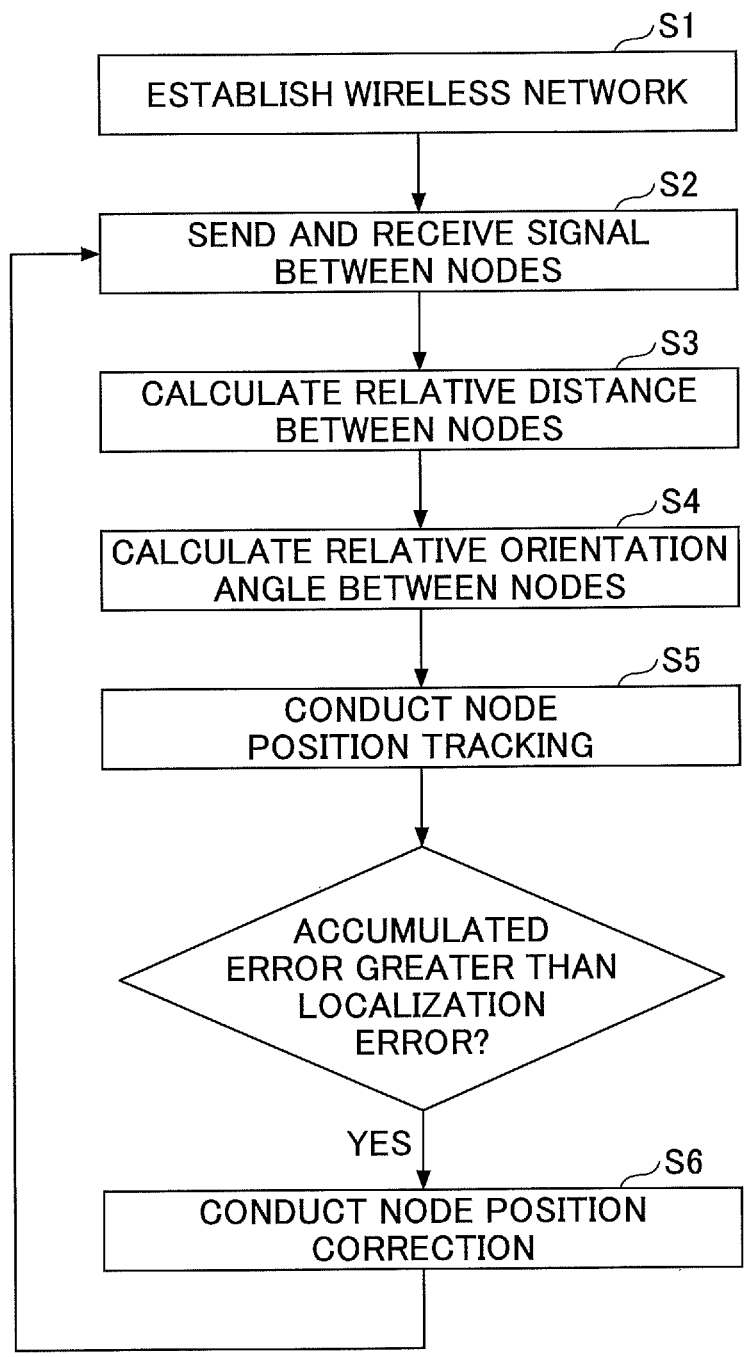
FIG. 5 is a flowchart of an example of the relative positioning method shown in FIG. 4.

FIG. 5 is the flowchart of the example of the relative positioning method.

As shown in FIG. 5, the relative positioning process may include (1) establishing a wireless network (STEP S1); (2) sending and receiving signals between two nodes (STEP S2); (3) calculating the distance between the two nodes (STEP S3); (4) calculating the relative orientation angle between the two nodes (STEP S4); (5) tracking the positions of the two nodes (STEP S5); and (6) correcting the positions of the two nodes (STEP S6).

Regarding STEP S1 in FIG. 5, in this example, it is supposed that the structure of the wireless network is a star topology based structure, as shown in FIG. 1. In the wireless network, the number of master and slave nodes may be changeable. That is, the roles of the master and slave nodes may change as the demand of localization changes. On the basis of the star topology based structure of the wireless network, an ordinary node (i.e., a slave node) needing to localize another node may become the master node in the wireless network, and then may start a localization process. After finishing the localization process, the master node may become a slave node again. In addition, the inertial sensor data of the respective nodes is shared in real time in the wireless network. Here one of the typical wireless network techniques may be Bluetooth or Bluetooth Low Energy (BLE) which has been widely utilized in a mobile device. In particular, as shown in FIG. 1, the wireless network includes a node Na (needing to localize another node in the wireless network) which is the master node in the star topology based structure; and a node Nb (whose position needs to be determined) which is a slave node in the star topology based structure. The roles of the nodes Na and Nb in the wireless network may change as the demand of localization changes. Additionally the obtained localization result is a relative localization result; that is, the relative distance is the distance between the nodes Na and Nb, and the relative orientation angle is the angle between the nodes Na and Nb, i.e., the angle between the orientation (also called a "reference direction" or "device orientation") of the node Na and the straight-line direction along the straight line passing through the nodes Na and Nb, as described above.

Regarding STEP S2 in FIG. 5, the master node sends a sound signal serving as a first signal, and the slave node receives the sound signal, and then replies with a second signal. Why a sound signal is selected to serve as the first signal is that the velocity of the sound signal is better for the relevant distance calculation. Additionally, since a node ID needs to be carried in the first signal, it is possible to conduct, in the sound signal, encoding with respect to the node ID on the basis of the frequency of the sound wave. In order to reduce the environmental noise and the influence due to the Doppler effect, the node ID may also be encoded according to the different changes of plural frequencies by using the sound signal. The second signal replied may be a sound signal or a radio (RF) signal. In order to reduce the influence of noise and to improve the exchange rate of data, it is preferred that the second signal replied be a radio signal. In general, the radio signal adopted when replying to the received sound signal is a BLE or Wi-Fi signal.

Regarding STEP S3 in FIG. 5, it is possible to adopt a TOF (Time-Of-Flight) based algorithm to calculate the relative distance. This kind of algorithm will be concretely described below.

However, the present invention is not limited to this. For instance, a TDOA based algorithm may also be adopted to calculate the relative distance. The TDOA based distance measurement may be achieved by using two signals having different propagation velocities. Usually it is possible to utilize a RF signal and a sound signal. In a case of mobile devices or smartphones, one signal may be a Wi-Fi signal, a Bluetooth signal, or a BLE signal, and another signal may be a sound signal based on a microphone or speaker.

Regarding STEPS S4 and S5 in FIG. 5, relative orientation angle calculation and node position tracking are conducted based on inertial sensor data. Since the accuracy of the inertial sensor data is different according to the type of node (e.g., a mobile device or smartphone), the localization accuracy of the relevant system mainly depends on the accuracy of the inertial sensor data of the nodes.

Regarding STEP S6 in FIG. 5, after the tracking error exceeds a predetermine limit (threshold), the relevant correction step may satisfy the demand of accurate localization.

Hereinafter, a time sequence related to this example will be depicted in detail by referring to FIG. 6.

Figure 6:
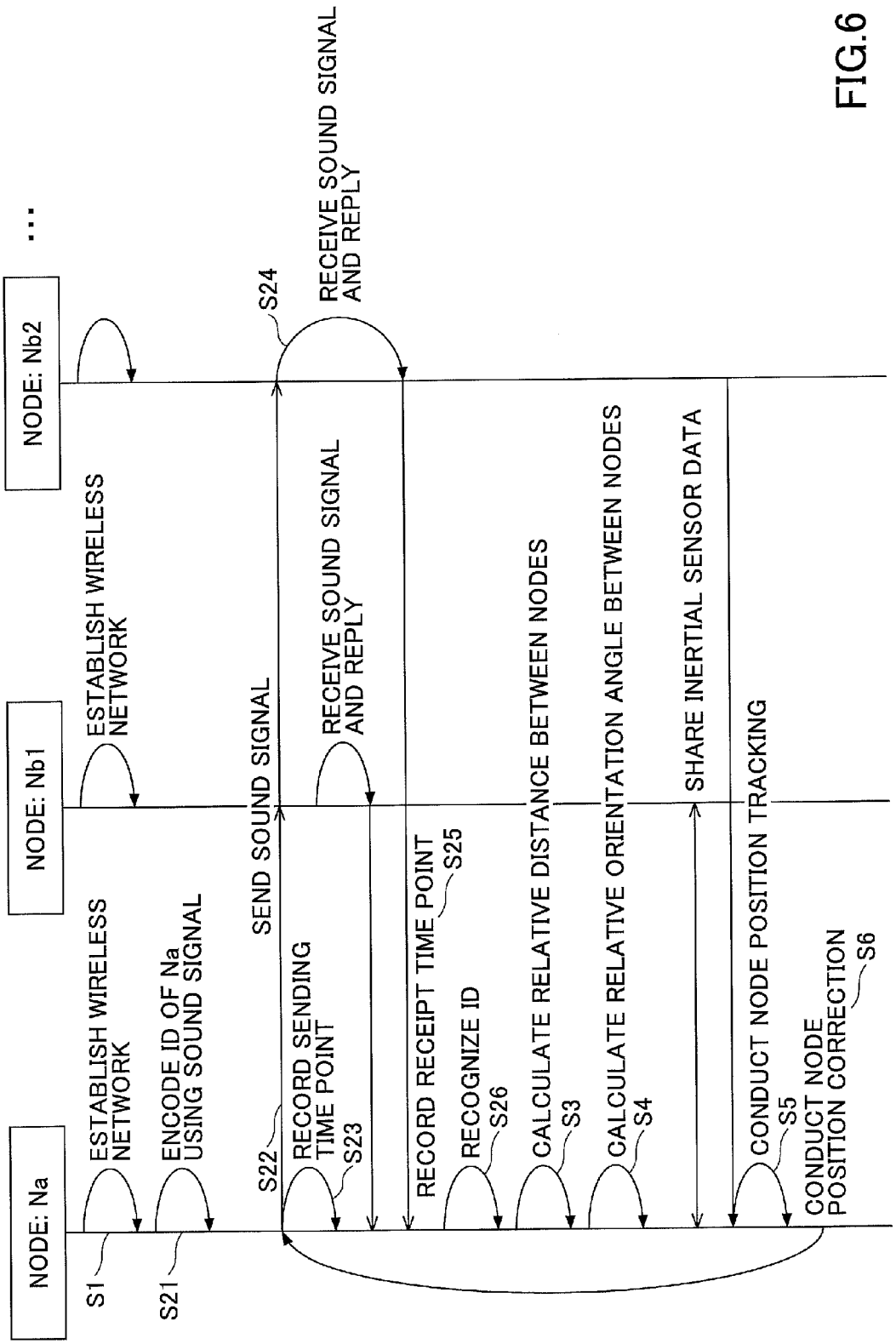
FIG. 6 illustrates a time sequence related to the example shown in FIG. 5.

FIG. 6 illustrates the time sequence related to the example shown in FIG. 5.

In FIG. 6, a detailed process of localizing a node is illustrated by using the signal flow between nodes. One or more steps in the time sequence of FIG. 6 may correspond to one or more steps in the flowchart of FIG. 5.

As shown in FIG. 6, the relative positioning method may include (1) establishing a wireless network based on plural nodes (STEP S1); (2) utilizing a sound signal (with a low frequency) to encode the ID of the master node Na by itself (STEP S21); (3) sending the sound signal by the master node Na (STEP S22); (4) recording the relevant sending time point by the master node Na (STEP S23); (5) receiving the sound signal and replying to it by the slave node Nb (STEP S24); (6) recording the relevant receipt time point by the master node Na (STEP S25); (7) checking the ID in the data replied so as to conduct ID confirmation (STEP S26) by the master node Na; (8) if the ID is confirmed, then calculating the distance between the two nodes according to a TOF based algorithm by the master node Na (STEP S3); (9) on the basis of the relevant inertial sensor data and the Doppler effect, calculating the relative orientation angle between the two nodes by the master node Na (STEP S4); (10) on the basis of the shared inertial sensor data, tracking the position of the slave node Nb in real time by the master node Na (STEP S5); and (11) if the accumulated error of the inertial sensor date exceeds a predetermined localization error of the relevant system, then re-localizing the slave node Nb so as to correct the position of the slave node Nb by the master node Na (STEP S6).

From here, the above steps will be described in detail by referring to FIGS. 5 and 6.

Regarding STEP S1 (FIGS. 5 and 6), the wireless network is established on the basis of the respective nodes which serve as ordinary nodes (i.e., slave nodes) therein. After that, if there is a node needing to seek and localize another node, then it may change its role so as to become the master node Na.

Figure 7:
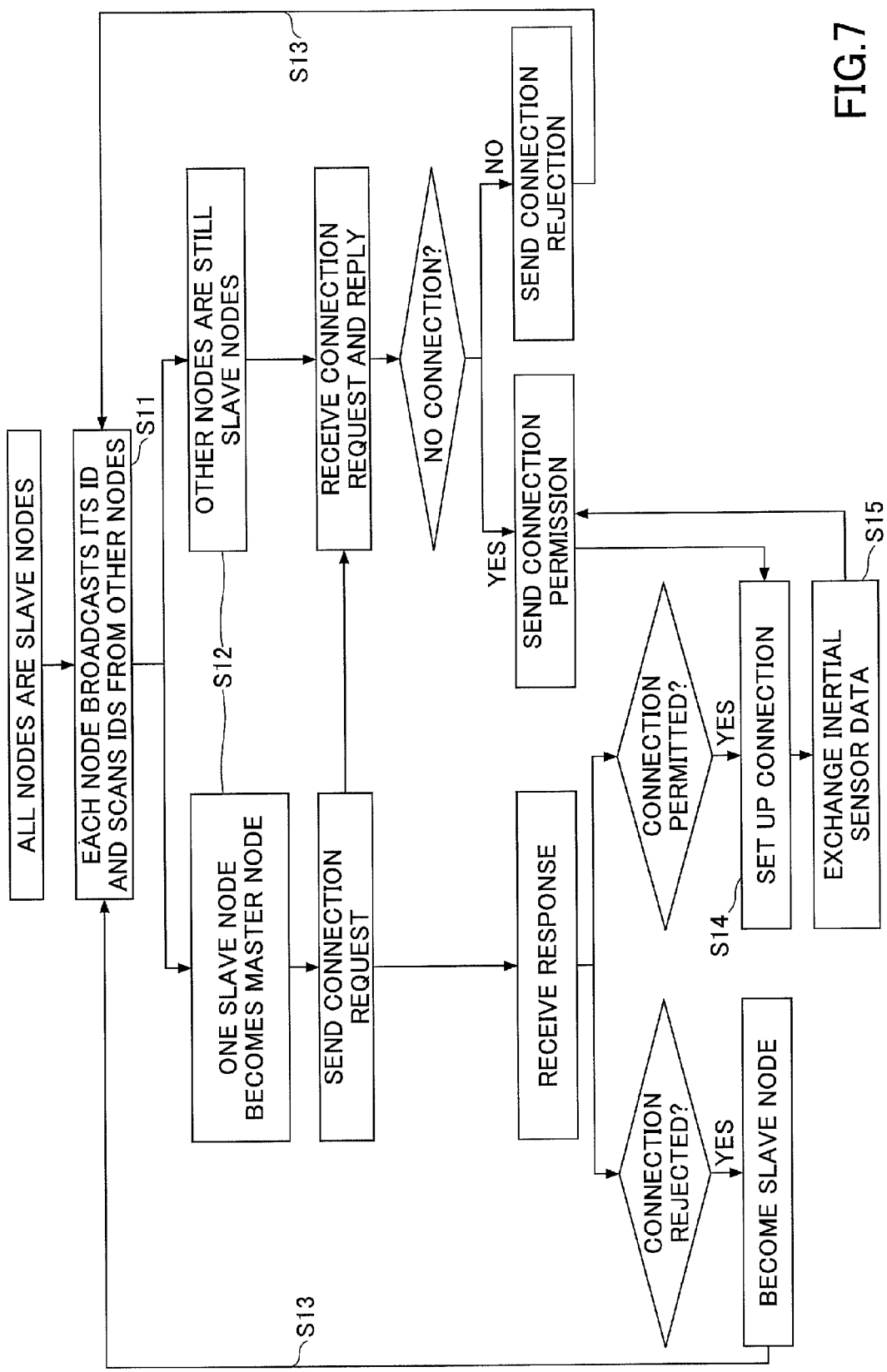
FIG. 7 is a flowchart of a process of establishing a wireless network.

FIG. 7 is a flowchart of a process of establishing the wireless network.

For example, the process of establishing the wireless network shown in FIG. 7 may adopt any proper conventional technique. As shown in FIG. 7, the process may include the following steps. (1) At the beginning, all the nodes are slave ones, and each of them broadcasts its own ID and scans IDs from the other nodes. The ID may include information of the interest and characteristic of the corresponding node (S11). (2) If a node generates, on the basis of an ID it scanned, a localization need (e.g., it finds that the interest information included in this ID is the same as its own interest information, so it wants to localize the node corresponding to this ID), then this node becomes the master node and that node having the same interest information is still a slave one (S12). (3) If the slave node is not connected to the master node, then the master node sends a connection request to the slave node. If the slave node rejects the connection request, then the master node becomes a slave one (S13). And then STEPS S12 and S13 are conducted. (4) If the slave node accepts the connection request, then the master node establishes a connection with the slave node (S14). (5) After establishing the connection, the master node starts an inertial sensor data exchange mechanism (S15), so that it is possible to exchange the inertial sensor data between the master and slave nodes. Here this mechanism may be adopted in any one of STEPS S2 to S6 (FIGS. 5 and 6).

Additionally it should be noted that the interest information of nodes may be applied in an application scenario where it is necessary to seek a node having the same interest information. Actually the interest information of a node may be represented by a node ID (e.g., it is possible to use different node IDs to refer to different pieces of interest information), or may be represented by the feature value related to a node (e.g., it is possible to use different feature values related to different node IDs to refer to different pieces of interest information). Of course, setting the interest information in this example is just for being able to be applied in the application scenario where it is necessary to find a node having the same interest information. However, the Doppler effect determination, the distance measurement, the node localization, the node position tracking, the node position correction, etc., in the embodiments of the present invention may also be applied in other application scenarios where it is not necessary to consider the interest information.

In addition, STEPS S11 to S14 shown in FIG. 7 are just for illustration, but not always necessary. Actually it is also possible to establish the wireless network including the nodes by utilizing any other well-known method as mentioned above.

Refer again to FIG. 6; STEPS S21 to S26 therein may correspond to STEP S2 in FIG. 5.

As for STEPS S21 to S23 in FIG. 6, the master node Na needing to localize the other nodes conducts ID encoding by using a sound signal, then sends the sound signal, and then records the relevant sending time point.

In particular, if a node wants to seek and localize other nodes, then it becomes a master node (i.e., the master node Na). And then, the master node Na carries out encoding with respect to its own node ID by using a sound signal. After that, the master node Na starts a localization process so as to send the sound signal including the ID to the other nodes (i.e., the node Nb). Eventually the master node Na records the relevant sending time $t_{as}$ after it sends the sound signal.

Here the ID encoding process may indicate that the master node Na conducts encoding according to its own ID by using the changes of plural frequencies. For instance, bit 0 may be represented by frequency decrease/increase, and bit 1 may be represent by frequency increase/decrease.

Figure 8:
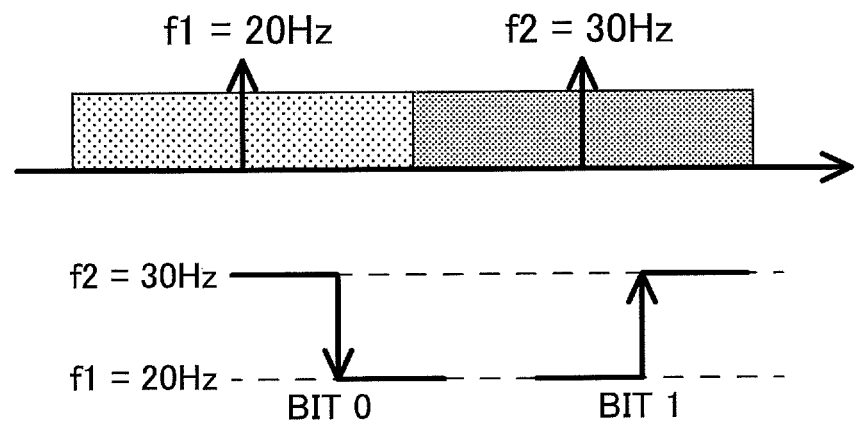
FIG. 8 illustrates an encoding approach based on the change of frequencies.

FIG. 8 illustrates an encoding approach based on the different changes of frequencies.

As shown in FIG. 8, if the master node Na sends a change of frequencies from f1 (20 Hz) to f2 (30 Hz), then that represents bit 0, and if it sends a change of frequencies from f2 to f1, then that represents bit 1. The frequency band used for encoding depends on the frequency band of the microphone and speaker of most mobile devices (e.g., smartphones), and is from 20 Hz to 30 KHz in general. Since a sound signal with a low frequency has a characteristic of bypassing obstacles, in the process of encoding, it is preferred to adopt 20 Hz and 30 Hz. In addition, since the sending frequencies are 20 Hz and 30 Hz, it is possible to use the frequency offset to determine that two mobile devices approach each other or depart from each other. This will be utilized in the follow-on relative orientation calculation process.

Moreover, when the master node Na sends the sound signal, perhaps it does not know whether slave nodes exit, and if they exist, the number of the slave nodes. As such, for example, the master node Na may broadcast the sound signal.

In an instance, a processing time delay $T_{ss}$ when the master node Na encodes its ID by using a sound signal and sends the sound signal may be decided by the frequency f for encoding the ID, the number of bits of the ID data of the master node Na, etc., as shown in the following equation (2).

$$T_{ss}=N_{ID} \times N_f \times (1/f_n) \times N_{pulse} \quad (2)$$

Here, $T_{ss}$ refers to the processing time delay when the master node Na conducts encoding with respect to its whole node ID on the basis of a sound signal, and sends it; $N_{ID}$ refers to the number of bits of the ID data of the master node Na; $N_f$ refers to the number of frequencies used for indicating each bit of the ID data of the master node Na; $f_n$ refers to the average value of the frequencies used; and $N_{pulse}$ refers to the number of pulses sent with respect to each bit of the ID data of the master node Na.

For instance, it is assumed that the ID of the master node Na is "001", the change of two frequencies 20 Hz and 30 Hz is utilized to represent bit 0 or 1, and in order to achieve redundant encoding so as to reduce the bit error rate, the ID of the master node Na is sent four times repeatedly, i.e., it is possible to conduct encoding with respect to an ID "0000, 0000,1111" by using a sound signal including the changes of the frequencies.

At this time, the sound signal sent by the master node Na includes 30 Hz to 20 Hz, 30 Hz to 20 Hz, 30 Hz to 20 Hz, 30 Hz to 20 Hz, 30 Hz to 20 Hz, 30 Hz to 20 Hz, 30 Hz to 20 Hz, 30 Hz to 20 Hz, 20 Hz to 30 Hz, 20 Hz to 30 Hz, 20 Hz to 30 Hz, and 20 Hz to 30 Hz.

And then, according to the above equation (2), it is possible to calculate the processing time delay $T_{ss}$, i.e., $$T_{ss} = 3 \times 2 \times \frac{1}{(20+30)/2} \times 4 = 0.96 \text{ s}.$$

Refer again to FIG. 6; regarding STEPS S24 and S25 therein, the master node Na receives the responses from the respective slave nodes, and records the receipt time points corresponding to the slave nodes. On the basis of the receipt time points, the master node Na may determine the positions of the respective slave nodes.

In particular, STEP S24 in FIG. 6 may include the following steps.

First a slave node (e.g., the node Nb2) in the wireless network may receive the sound signal (including the ID information of the master node Na) from the maser node Na.

Next the slave node Nb2 decodes the sound signal according to the frequency change rule that the master node Na adopted, so as to obtain the ID of the master node Na.

Since the master node adopts the changes of frequencies to conduct encoding with respect to its own ID by using the sound signal, although there is a frequency offset between the sound signals at the sending node and the receipt node due to the relative movement of the two nodes, it is still possible to correctly recognize the changes of frequencies.

For instance, regarding the sound signal at the receipt node, its frequencies may increase due to the first type Doppler effect (i.e., approaching each other). However, bit 0 is represented by the change from 30 Hz to 20 Hz, and bit 1 is represented by the change from 20 Hz to 30 Hz. As such, even in a case where at the receipt node, the frequencies of the sound signal are changed to 32 Hz to 22 Hz from 30 Hz to 20 Hz, it is still possible to determine that the change from 32 Hz to 22 Hz is one from a big value to a small value, i.e., represents bit 0; and vice visa. In a similar way, when the frequencies of the sound signal at the receipt node decrease due to the second type Doppler effect (i.e., departing from each other), it is the same.

After that, the slave node Nb2 packages the ID of the master node Na and the ID of itself so as to acquire a data packet, and then sends the data packet to the master node Na via a radio signal.

On the other hand, the master node Na receives the data packet so as to obtain the ID of itself and the ID of the slave node Nb2, and then determines whether the two IDs match each other.

If the ID of the master node Na is the same as the ID of the slave node Nb2, then the master node Na records the time point of receiving the data packet.

Here a processing time delay $T_{sr}$ generated when the slave node Nb2 decodes the sound signal is decided on the basis of the frequencies of the sound signal and the number of bits of the ID data of the master node Na, and is similar to the processing time delay $T_{ss}$ of the master node Na. The calculation of the processing time delay $T_{sr}$ is the same as the above equation (2). In addition, a processing time delay $T_{ws}$ of packaging and sending the data packet at the slave node Nb2 as well as a processing time delay $T_{wr}$ of receiving and depackaging the data packet are dependent on the wireless network. As such, in a case of physical layer data, compared to the processing time delay $T_{sr}$, the processing time delays $T_{ws}$ and $T_{wr}$ may be ignored.

As for STEP S26 of FIG. 6, the matching determination process of the IDs of the master node Na and the slave node Nb2 may ensure that the slave node Nb2 has correctly received the sound signal sent from the master node Na, and has conducted a correct process and reply. This step may reduce the interference caused by the environmental noise and the other nodes. In this step, if it is determined that the two IDs do not match each other, then the master node Na does not record the relevant receipt time point, and starts the localization process again.

Refer again to FIG. 6; regarding STEP S3 therein which corresponds to STEP S3 in FIG. 5, the relative distance may be calculated on the basis of the TOF based algorithm.

Figure 9:
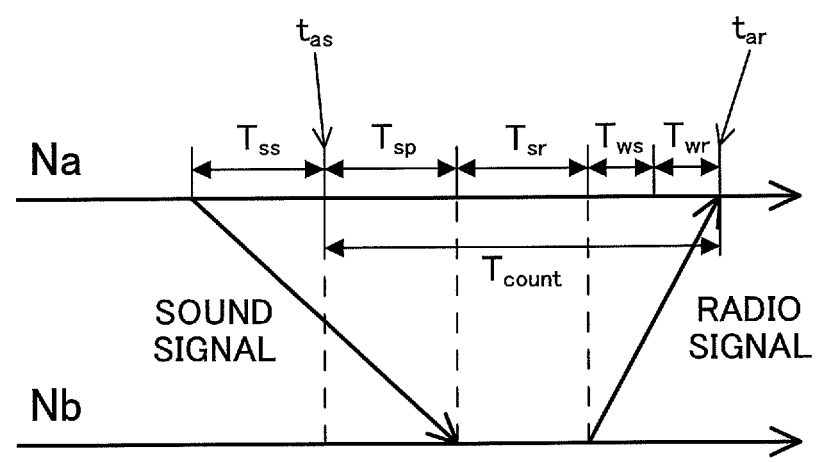
FIG. 9 illustrates a time delay in a time delay compensation process based on a TOF (Time-Of-Flight) distance measurement principle.

FIG. 9 illustrates a time delay in a time delay compensation process based on a TOF distance measurement principle.

As shown in FIG. 9, the total time delay in the time delay compensation process may include (1) the processing time delay $T_{ss}$ occurring when conducting ID encoding and sending the sound signal by the master node Na on the basis of its own ID; (2) the propagation time delay $T_{sp}$ of the sound signal from the master node Na to the slave node Nb; (3) the processing time delay $T_{sr}$ occurring when receiving and processing the sound signal by the slave node Nb; (4) the processing time delay $T_{ws}$ occurring when making the data packet and sending the data packet via a radio signal by the slave node Nb; and (5) the processing time delay $T_{wr}$ occurring when receiving and processing the data packet by the master node Na. Here, as described above, if the radio signal is one corresponding to the physical layer, then the processing time delays $T_{ws}$ and $T_{wr}$ may be ignored.

Here it is apparent that the distance between the master node Na and the slave node Nb may be calculated on the basis of the above-described time delays, and the calculation accuracy is mainly dependent on the precision of the relevant timer and the ignored processing time delay(s).

In particular, the calculation of the distance between the master node Na and the slave node Nb may be on the basis of TOF (Time of Flight). As shown in FIG. 9, the propagation time delay $T_{sp}$ of the sound signal is decided on the basis of $T_{ss}$, $T_{sr}$, $T_{ws}$, and $T_{wr}$. In this case, the timing point $t_{as}$ is located on the right side of $T_{ss}$; that is, it is the sending end time point. As such, the real total time delay in the time delay compensation process may be expressed by the following equation (3).

$$T_{count} = t_{as} - t_{ar} = T_{sp} + T_{sr} + T_{ws} + T_{wr} \quad (3)$$

Here, $T_{count}$ stands for the time difference between the timing points $t_{as}$ and $t_{ar}$, and represents the time delay from sending the sound signal to receiving the radio signal at the master node Nb; $T_{ss}$ stands for the processing time delay of conducting ID encoding and sending the sound signal at the master node Na; $T_{sp}$ stands for the propagation time delay of the sound signal between the master node Na and slave node Nb; $T_{sr}$ stands for the processing time delay of receiving and processing the sound signal at the slave node Nb; $T_{ws}$ stands for the processing time delay of data packaging and sending the radio signal at the slave node Nb; and $T_{wr}$ stands for the time delay of receiving the radio signal and data de-packaging at the master node Na.

As a result, by utilizing the following equation (4), it is possible to calculate the distance between the master node Na and the slave node Nb.

$$d_{12} = v \times T_{sp} = v \times (T_{count} - T_{sr} - T_{ws} - T_{wr}) \quad (4)$$

Here, $d_{12}$ refers to the distance between the master node Na and the slave node Nb; v refers to the sound velocity; $T_{sp}$ refers to the propagation time delay of the sound signal; $T_{count}$ refers to the time delay from sending the sound signal to receiving the radio signal at the master node Na; $T_{sr}$ refers to the processing time delay of receiving and processing the sound signal at the slave node Nb; $T_{ws}$ refers to the processing time delay of conducting the data packaging and sending the radio signal at the slave node Nb; and $T_{wr}$ refers to the processing time delay of receiving the radio signal and conducting the data de-packaging at the master node Na.

In the above equations (3) and (4), $T_{sr} \approx T_{ss}$, and if the radio signal is one corresponding to the physical layer, then $T_{ws} \approx T_{wr} = 0$. In addition, as shown in FIG. 9, if the timing point $t_{as}$ is located on the left side of $T_{ss}$, then it is the sending start time point. In this case, the real total time delay in the time delay compensation process should be expressed by the following equation.

$$T_{count} = t_{as} - t_{ar} = T_{ss} + T_{sp} + T_{sr} + T_{ws} + T_{wr} \quad (3')$$

Here it should be noted that the calculation method of the distance between the master node Na and the slave node Nb in the embodiments of the present invention is not limited to the TOF based algorithm. That is, it is also possible to adopt any other proper algorithm to calculate the distance, for instance, a RSSI, TDOA, AOA, or POA based distance measurement technique.

Figure 10:
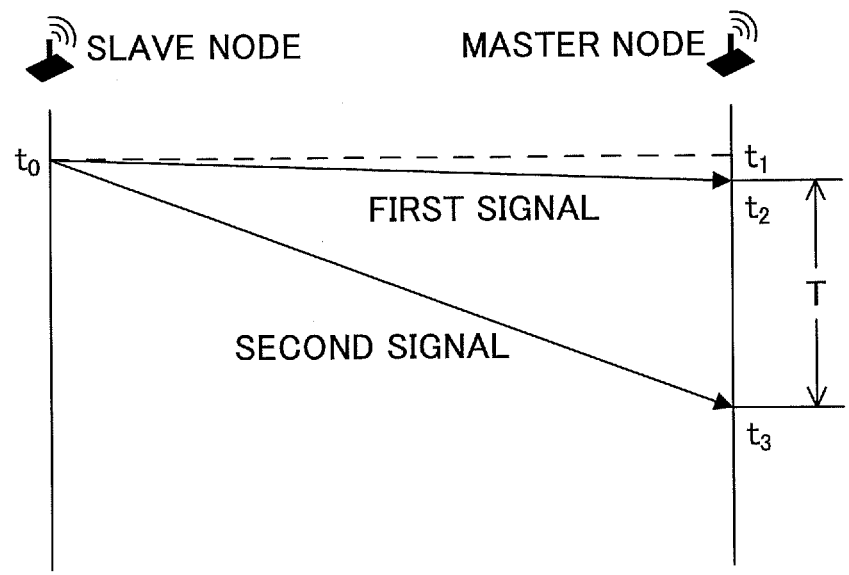
FIG. 10 illustrates relative distance measurement based on a TDOA (Time Difference Of Arrival) distance measurement principle.

FIG. 10 illustrates relative distance measurement based on the TDOA distance measurement principle.

As shown in FIG. 10, a slave node sends a first signal and a second signal, whose propagation velocity is greater than that of the first signal, in a certain time period to a master node. By utilizing the sending time point of the first and second signals as well as the receipt time points of the two signals, it is possible to estimate the relative distance between the master and slave nodes in the certain time period according to the TDOA based algorithm.

In an instance, the first signal may be a sound signal, and the second signal may be a radio signal. Since the propagation velocity of the sound signal is less than that of the radio signal, and because the propagation velocity of the radio signal is very large, the time error and the decoding error are relatively small. As such, it is possible to let the sending time point of the radio signal be the reference of the sending time point in TDOA. At the same time, it is also possible to let the ID obtained by decoding the radio signal be a reference ID for conducting ID matching with the ID obtained by decoding the sound signal. Here it should be noted that since the principle of the TDOA based distance measurement is well-known, its detailed description is omitted.

Refer again to FIGS. 5 and 6; in STEP S4, the master node Na may calculate the relative orientation angle between itself and the slave node Nb on the basis of the inertial sensor data and the Doppler effect.

Figure 11:
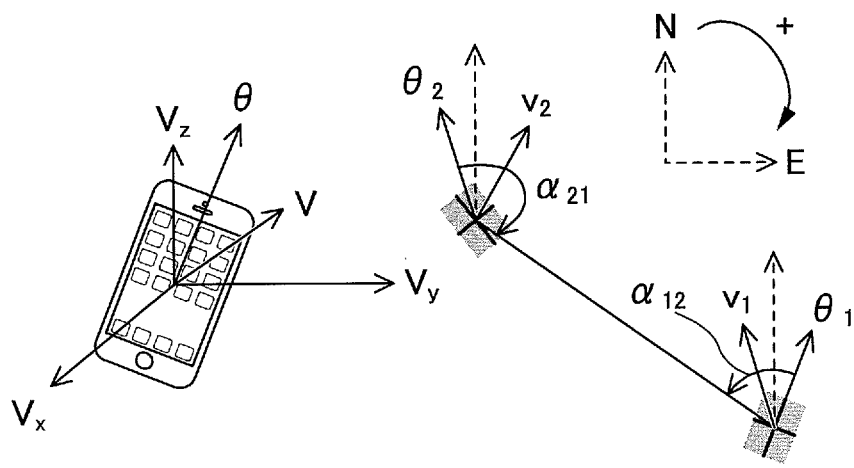
FIG. 11 illustrates the principle of a relative orientation angle calculation process.

FIG. 11 illustrates the principle of the relative orientation angle calculation process.

As shown in FIG. 11, the inertial sensor data of a node is a vector having both magnitude and direction. Here the direction is defined as an absolute angle based on the North Magnetic Pole, and the clockwise rotation from north to south is defined as positive. As such, the relative orientation from the master node Na to the slave node Nb may refer to one based on the absolute angle of the master node Na. In general, a node may be a smart phone having an inertial sensor such as a gyroscope or an accelerometer, so it may be easy to obtain the inertial sensor data including the absolute angle $\theta$ of the mobile device, the velocity $v$ of the mobile device, the absolute angle $\theta_v$ of the velocity, etc. These will be utilized in the follow-on relative orientation angle calculation process.

In particular, the Doppler effect is determined based on the frequency of the sound signal, as shown in FIG. 3. When a frequency offset occurs in the sound signal received by the slave node Nb, the slave Nb may determine, based on the frequency offset, that it approaches the master node Na or departs from the master node Na.

If the receipt frequency of the sound signal at the slave node Nb is greater than the sending frequency of the sound signal at the master node Na, then the slave node Nb approaches the master node Na. In this case, the receipt frequency of the sound signal at the slave node Nb is expressed by the following equation.

$$f' = f \times \frac{v + v_0}{v - v_s} \quad (5)$$

On the other hand, if the receipt frequency of the sound signal at the slave node Nb is less than the sending frequency of the sound signal at the master node Na, then the slave node Nb departs from the master node Na. In this case, the receipt frequency of the sound signal at the slave node Nb is expressed by the following equation.

$$f' = f \times \frac{v - v_0}{v + v_s} \quad (6)$$

Here, in the equations (5) and (6), f' stands for the receipt frequency of the sound signal at the slave node Nb; f stands for the sending frequency of the sound signal at the master node Na; v stands for the propagation velocity of the sound signal; $v_0$ stands for the moving velocity of the slave node Nb; and $v_s$ stands for the moving velocity of the master node Na.

In addition, in order to achieve the relative orientation angle calculation process, all the nodes in the wireless network may periodically exchange their inertial sensor data with each other. The inertial sensor data of the node may include the moving velocity v and the absolute angle $\theta$ (based on the North Magnetic Pole) of itself. The inertial sensor data is a vector having both magnitude and direction. The direction is one based on the absolute orientation angle of the North Magnetic Pole. The relative orientation angle $\alpha_{12}$ between the master node Na and the slave node Nb is a relative angle based on the absolute orientation angle of the master node Na.

On the basis of the inertial sensor data and the Doppler effect, the relative orientation angle $\alpha_{12}$ between the master node Na and the slave node Nb may be calculated according to the following equations.

$$f' = f \times \frac{v \pm v_0}{v \mp v_s} \quad (7)$$

$$v_0 = v_2 \times \cos(\alpha_{21} + \theta_2 - \theta_{2v}) \quad (8)$$

$$v_s = v_1 \times \cos(\alpha_{12} + \theta_1 - \theta_{1v}) \quad (9)$$

$$(\alpha_{21} + \theta_2) + (\alpha_{12} + \theta_1) = \pi \quad (10)$$

Here, f' refers to the receipt frequency of the sound signal at the slave node Nb; f refers to the sending frequency of the sound signal at the master node Na; v refers to the propagation velocity of the sound signal; $v_0$ refers to the moving velocity of the slave node Nb; $v_s$ refers to the moving velocity of the master node Na; $v_1$ refers to the moving velocity vector of the master node Na; $v_2$ refers to the moving velocity vector of the slave node Nb; $\alpha_{12}$ refers to the relative orientation angle of the slave node Nb based on the master node Na; $\alpha_{21}$ refers to the relative orientation angle of the master node Na based on the slave node Nb; $\theta_1$ refers to the absolute direction of the master node Na; $\theta_2$ refers to the absolute direction of the slave node Nb; $\theta_{1v}$ refers to the direction of the velocity vector $v_1$ of the master node Na; and $\theta_{2v}$ refers to the direction of the velocity vector $v_2$ of the slave node Nb.

As a result, in this way, it is possible to obtain the relative orientation angle $\alpha_{12}$ from the master node Na to the slave node Nb and/or the relative orientation angle $\alpha_{21}$ from the slave node Nb to the master node Na.

Refer again to FIGS. 5 and 6; in STEP S5, after the master node Na calculates the relative distance and the relative orientation angle between itself and the slave node Nb, the master node Na may uniquely determine, on the basis of the two, the relative positional relation between itself and the slave node Nb. After that, it is possible to further track, in real time, the position of the slave node Nb on the basis of the shared inertial sensor data.

Figure 12:
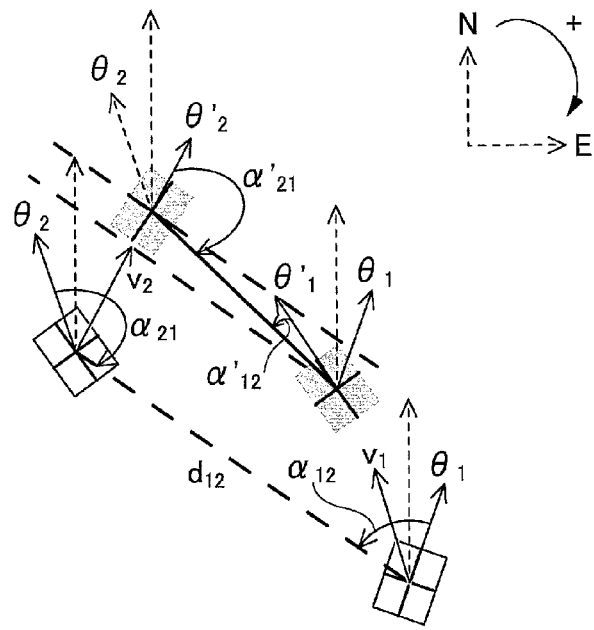
FIG. 12 illustrates the principle of a node position tracking process based on inertial sensor data.

FIG. 12 illustrates the principle of node position tracking based on the inertial sensor data.

As shown in FIG. 12, on the basis of the inertial sensor data shared in the whole wireless network, it is possible to calculate the relative distance and the relative orientation angle between any two nodes in real time, without frequently sending a sound signal and/or a radio signal. The tracking frequency is mainly based on the speed of sharing the inertial sensor data, and is one of the important factors deciding the system localization accuracy. By the way, another important deciding factor is the inertial sensor accuracy.

The node position tracking process conducted by the master node Na with respect to the slave node Nb contains the following steps, as shown in FIG. 12.

First, after finishing the localization process, the master node Na may determine the position of the slave node Nb on the basis of the relative distance and the relative orientation angle.

Next, by conducting the inertial sensor data exchange in the whole wireless network, the master node Na may obtain the moving information of the slave node Nb.

And then, on the basis of the positional information and the inertial sensor data of the master node Na and the slave node Nb updated in real time, the master node Na updates the relative orientation angle of the slave node Nb, as shown by the following equations.

$$\alpha_{12}' + \Delta\alpha = \alpha_{12} + \Delta\theta_1 \quad (11)$$

$$\alpha_{21}' + \Delta\alpha = \alpha_{21} + \Delta\theta_2 \quad (12)$$

$$(\alpha_{21}' + \theta_2') + (\alpha_{12}' + \theta_1') = \pi \quad (13)$$

Here, $\alpha_{12}'$ stands for the relative orientation angle of the slave node Nb based on the master node Na after update; $\alpha_{21}'$ stands for the relative orientation angle of the master node Na based on the slave node Nb after update; $\Delta\alpha$ stands for the variation of the relative orientation angle before and after update; $\delta_1'$ stands for the absolute direction of the master node Na after its position changes; $\theta_2'$ stands for the absolute direction of the slave node Nb after its position changes; $\Delta\theta_1$ stands for the variation of the absolute angle of the master node Na before and after its position changes; and $\Delta\theta_2$ stands for the variation of the absolute angle of the slave node Nb before and after its position changes.

As a result, according to the above equations (11) to (13), it is possible to obtain the relative orientation angles $\alpha_{12}'$ and $\alpha_{21}'$ as well as the relative orientation angle variation $\Delta\alpha$ after update.

In the same way, on the basis of the positional information and the inertial sensor data of the master node Na and the slave node Nb updated in real time, the master node Na may update the distance between itself and the slave node Nb, as shown by the following equations.

$$d'_{12}|_{ah} = d_{12} + \left( \int v_1 \times \cos(\alpha_{12} + \theta_1 - \theta_{1v}) dt - \int v_2 \times \cos(\alpha_{21} + \theta_2 - \theta_{2v}) dt \right) \quad (14)$$

$$d'_{12}|_{av} = \int v_1 \times \sin(\alpha_{12} + \theta_1 - \theta_{1v}) dt - \int v_2 \times \sin(\alpha_{21} + \theta_2 - \theta_{2v}) dt \quad (15)$$

$$d'^2_{12} = d'_{12}|^2_{ah} + d'_{12}|^2_{av} \quad (16)$$

$$\tan \Delta\alpha = \frac{d'_{12}|_{av}}{d'_{12}|_{ah}} \quad (17)$$

Here, $d_{12}'$ refers to the distance tracked according to the inertial sensor data; $d_{12}$ refers to the distance measured by the localization process; $d_{12}'|_{ah}$ refers to the distance of $\alpha_{12}$ changed along the horizontal direction; $d_{12}'|_{av}$ refers to the distance of $\alpha_{12}$ changed along the vertical direction; $\alpha_{12}$ refers to the relative orientation angle of the slave node Nb based on the master node Na; $\alpha_{21}$ refers to the relative orientation angle of the master node Na based on the slave node Nb; $v_1$ refers to the moving velocity vector of the master node Na; $v_2$ refers to the moving velocity vector of the slave node Nb; $\theta_1$ refers to the absolute direction of the master node Na; $\theta_2$ refers to the absolute direction of the slave node Nb; $\Delta\alpha$ refers to the direction of the velocity vector $v_1$ of the master node Na; $\theta_{2v}$ refers to the direction of the velocity vector $v_2$ of the slave node Nb; and $\Delta\alpha$ refers to the variation of the relative orientation angle before and after update.

As a result, in this way, it is possible to obtain the relative distance from the master node Na to the slave node Nb after update.

Refer again to FIGS. 5 and 6; in STEP S6, it is possible to check the tracking error. If the tracking error exceeds a predetermined threshold, then the master node Na may start a signal sending process again so as to correct the position of the slave node Nb.

In particular, correcting the position of the slave node Nb by the master node Na includes the following steps, as shown in FIG. 5.

The master node Na determines whether the accumulated error of the inertial sensor data exceeds a predetermined localization error. If the accumulated error of the inertial sensor data exceeds the predetermined localization error, then the master node Na starts the localization process again so as to obtain the position of the slave node Nb; otherwise, the master node Na continues to track the position of the slave node Nb, and to determine whether the accumulated error of the inertial sensor data exceeds the predetermined localization error.

For example, the predetermined localization error may be obtained based on experience or simulation.

Therefore, it may be understood from the above that the relative positioning method is obtaining the relative distance between two nodes in a wireless network on the basis of the TOF algorithm based measurement and calculating the relative orientation angle between the two nodes on the basis of the Doppler effect and the inertial sensor data of the two nodes, so as to obtain the relative positioning result. In addition, the inertial sensor data may also be utilized for tracking the node positions. Since the relative positioning method may be achieved in a mobile device, and does not need any beacon node, special device, assistance parameter, etc., its cost is low, and its feasibility is high.

6. Relative Orientation Angle Calculation Device

In an embodiment of the present invention, a relative orientation angle calculation device is provided by which it is possible to estimate the relative orientation angle between two devices (e.g., first and second mobile devices) in a specific environment.

Figure 13:
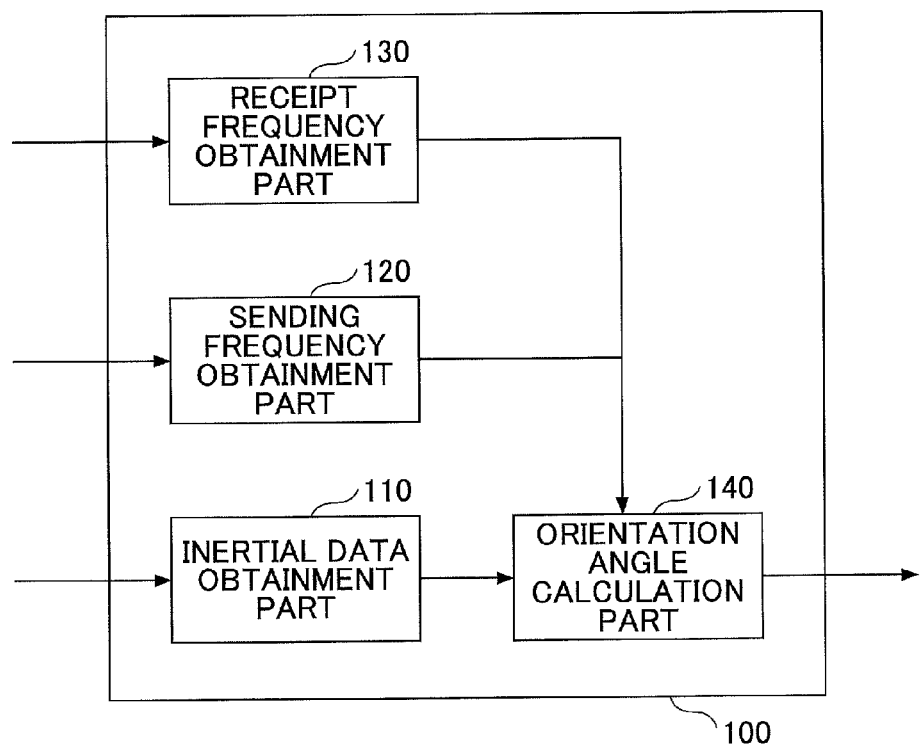
FIG. 13 is a functional block diagram of a device for calculating a relative orientation angle, according to an embodiment of the present invention.

In what follows, the relative orientation angle calculation device according to this embodiment will be depicted by referring to FIG. 13.

FIG. 13 is a functional block diagram of a relative orientation angle calculation device 130 according to this embodiment.

As shown in FIG. 13, the relative orientation angle calculation device 130 may include an inertial data obtainment part 110, a sending frequency obtainment part 120, a receipt frequency obtainment part 130, and an orientation angle calculation part 140.

The inertial data obtainment part 110 is configured to be able to obtain the inertial sensor data of the first and second mobile devices. The first mobile device may send a first signal to the second mobile device.

The sending frequency obtainment part 120 is configured to be able to obtain the sending frequency that the first signal has when the first mobile device sends the first signal to the second mobile device.

The receipt frequency obtainment part 130 is configured to be able to obtain the receipt frequency that the first signal has when the second mobile device receives the first signal from the first mobile device. The first signal receives the influence of the Doppler effect in the sending process in which the first signal is sent to the second mobile device from the first mobile device.

The orientation angle calculation part 140 is configured to be able to calculate, on the basis of the inertial sensor data, the sending frequency, and the receipt frequency, the relative orientation angle between the first and second mobile devices. The relative orientation angle refers to the angle between the device orientation (an absolute direction) of one of the two mobile devices and the direction (also called a "straight-line direction") along the straight line from the one mobile device to another.

In an example, the orientation calculation part 140 may conduct the following steps so as to calculate the relative orientation angle, namely, determining the type of the Doppler effect on the basis of the magnitude relation between the sending and receipt frequencies; and depending on the type of the Doppler effect, calculating the relative orientation angle on the basis of the inertial sensor data, the sending frequency, and the receipt frequency.

In particular, the orientation angle calculation part 140 may calculate the relative orientation angle by carrying out the following steps, namely, (1) on the basis of the inertial sensor data, calculating a first moving velocity component of the first mobile device in the straight-line direction and a second moving velocity component of the second mobile device in the straight-line direction; (2) according to the type of the Doppler effect (i.e., the above-described first and second types), generating, on the basis of the first and second moving velocity components, a first relation between the first relative orientation angle of the first mobile device relative to the second mobile device and the second relative orientation angle of the second mobile device relative to the first mobile device; (3) generating, on the basis of the first device orientation of the first mobile device and the second device orientation of the second mobile device, a second relation between the first relative orientation angle and the second relative orientation angle; and (4) solving, on the basis of the first and second relations, the first relative orientation angle and/or the second relative orientation angle.

Since the functions and processes of the inertial data obtainment part 110, the sending frequency obtainment part 120, the receipt frequency obtainment part 130, and the orientation angle calculation part 140 have been concretely described above, the repeated descriptions are omitted here.

As a result, by utilizing the relative orientation angle calculation device according to this embodiment, it is possible to use the inertial sensor data of at least two mobile devices and the Doppler effect that the radio signal sent between the mobile devices receives, so as to calculate the relative orientation angle between the mobile devices. That is, in the relative orientation angle calculation process, it is possible to achieve relative orientation angle calculation on the basis of the Doppler effect and the inertial sensor data only between two mobile devices, i.e., it is not necessary to use an additional mobile device or to introduce other auxiliary parameters. As a result, the relative orientation angle calculation device according to this embodiment may directly utilize the influence of the Doppler effect on the radio signal sent between two mobile devices so as to obtain the relative positional information of the two mobile devices, without using any initial condition.

7. Relative Positioning Apparatus

In an embodiment of the present invention, a relative positioning apparatus is provided by which it is possible to determine the relative positions of two mobile devices (e.g., first and second mobile devices) on the basis of the relative orientation angles and the relative distance between the two mobile devices.

Figure 14:
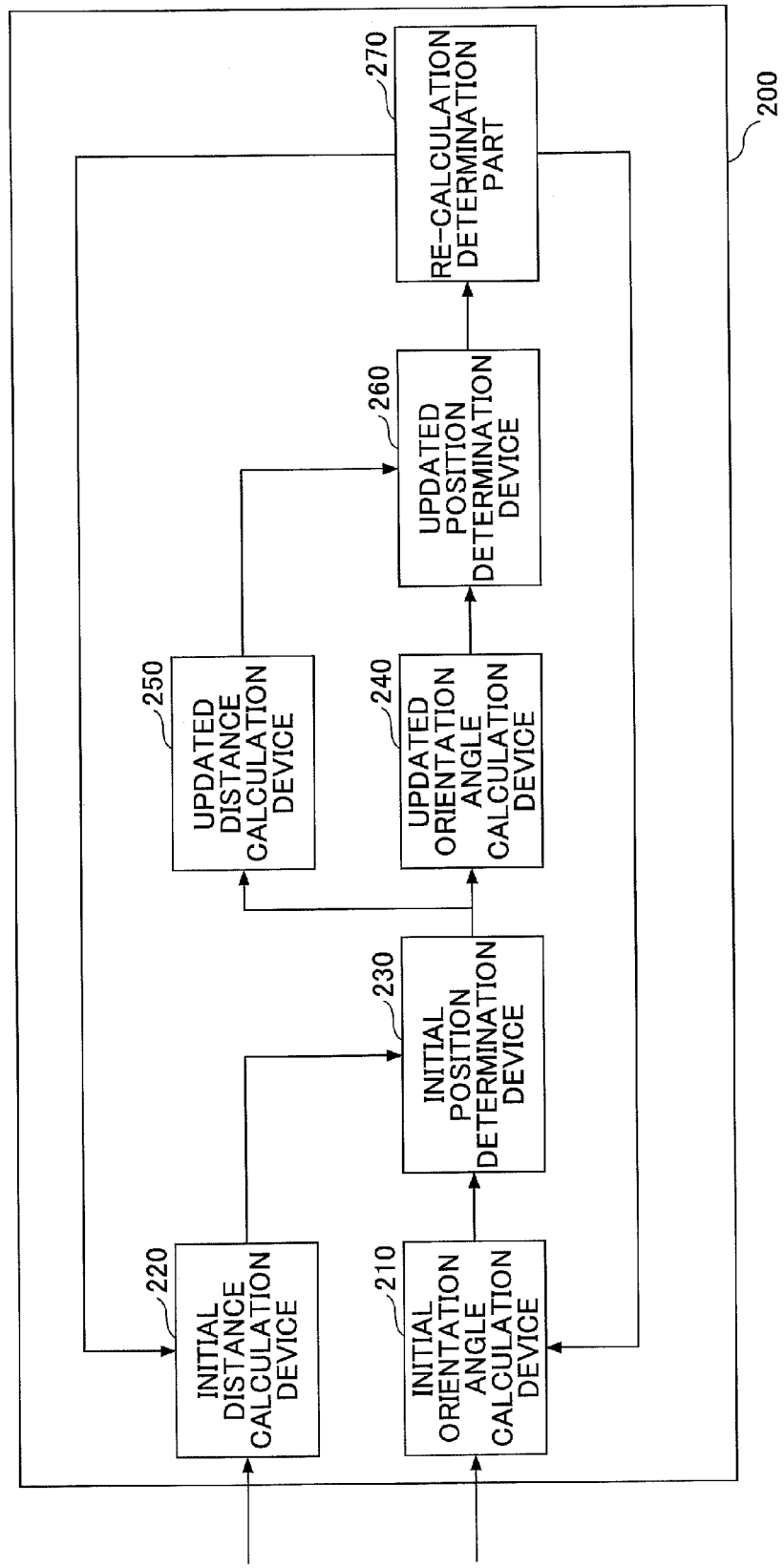
FIG. 14 is a functional block diagram of a relative positioning apparatus according to an embodiment of the present invention.

In what follows, the relative positioning apparatus according to this embodiment will be depicted by referring to FIG. 14.

FIG. 14 is a functional block diagram of a relative positioning apparatus 200 according to this embodiment.

As shown in FIG. 14, the relative positioning apparatus 200 may include an initial orientation angle calculation device 210, an initial distance calculation device 220, and an initial position determination device 230.

The initial orientation angle calculation device 210 is configured to be able to calculate the initial relative orientation angle between the first and second mobile devices.

The initial distance calculation device 220 is configured to be able to calculate the initial relative distance between the first and second mobile devices.

The initial position determination device 230 is configured to be able to determine the initial relative positional relation between the first and second mobile devices on the basis of the initial relative orientation angle and the initial relative distance.

In an example, the initial orientation angle calculation device 210 may calculate the initial relative orientation angles between the first and second mobile devices by adopting the relative orientation angle calculation method according to the embodiments of the present invention.

In an example, the initial relative distance calculation device 220 may calculate the initial relative distance by conducting the following steps, namely, (1) obtaining the sending end time point of a first signal sent at the first mobile device; (2) obtaining the receipt start time point of a second signal received at the first mobile device, the second signal being one sent to the first mobile device after the second mobile device receives the first signal; (3) obtaining the processing time delay when the second mobile device processes the first signal, and generates and sends the second signal; and (4) calculating, on the basis of at least the sending end time point, the receipt start time point, the processing time delay, and the propagation velocities of the first and second signals, the initial relative distance.

In particular, the initial distance calculation device 220 may obtain the receipt start time point by carry out the following step, namely, obtaining the receipt start time point in response to determining that the ID information analyzed from the second signal by the first mobile device includes the ID information of the first mobile device itself.

In addition, the first signal includes the ID information of the first mobile device represented by the different changes of plural frequencies. The second signal includes the ID information of the first and second mobile devices represented by the different changes of plural frequencies.

In an example, the relative positioning apparatus 200 may further include an updated orientation angle calculation device 240, an updated distance calculation device 250, and an updated position determination device 260.

The updated orientation angle calculation device 240 is configured to be able to re-obtain, after determining the initial relative positional relation, the inertial sensor data of the first and second mobile devices, and on the basis of the re-obtained inertial sensor data, to calculate the updated relative orientation angle between the first and second mobile devices.

The updated distance calculation device 250 is configured to be able to calculate, on the basis of the updated relative orientation angle and the re-obtained inertial sensor data, the updated relative distance between the first and second mobile devices.

The updated position determination device 260 is configured to be able to estimate, on the basis of the updated relative orientation angles and the updated relative distance, the updated relative positional relation between the first and second mobile devices.

In an example, the relative positioning apparatus 200 may further includes a re-calculation determination part 270 which is configured to, after estimating the updated relative positional relation, be capable of calculating the accumulated error related to the updated relative positional relation; determining whether the accumulated error is greater than or equal to a predetermined threshold; and in response to determining that the accumulated error is greater than or equal to the predetermined threshold, re-calculating the initial relative orientation angle and the initial relative distance between the first and second mobile devices.

Since the functions and processes of the initial orientation angle calculation device 210, the initial distance calculation device 220, the initial position determination device 230, the updated orientation angle calculation device 240, the updated distance calculation device 250, the updated position determination device 260, and the re-calculation determination part 270 have been depicted above, the repeated descriptions are omitted here.

As a result, by utilizing the relative positioning apparatus according to this embodiment, it is possible to achieve a relative positioning process in an unknown environment, i.e., two mobile devices may realize the demand of relative positioning between them only by themselves, without any beacon node, etc. In addition, by utilizing the relative positioning apparatus, it is also possible to track, on the basis of the inertial sensor data of the mobile devices, the mobile device which has been localized, so that it is possible to realize the demand for the real-time relative localization.

8. Mobile Device

In addition, in an embodiment of the present invention, a mobile device is provided in which the relative orientation calculation method and device as well as the relative positioning method and apparatus according the embodiments of the present invention may be applied.

Figure 15:
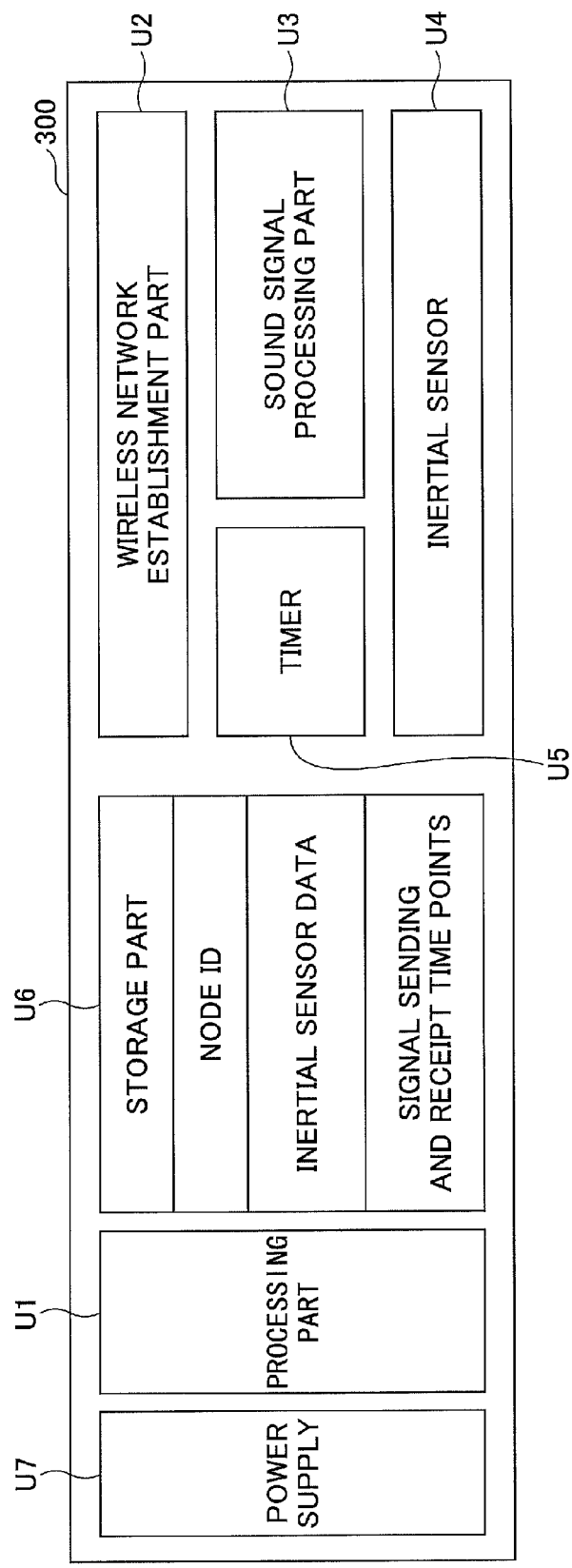
FIG. 15 is a structural block diagram of the hardware of a mobile device according to an embodiment of the present invention.

FIG. 15 is a structural block diagram of the hardware of a mobile device 300 according to this embodiment.

As shown in FIG. 15, the mobile device (also called a "node") 300 may include a processing part U1 configured to control the behavior of the node 300; a wireless network establishment part U2 configured to establish the relevant wireless network; a sound signal processing part U3 configured to conduct ID encoding by using a sound signal, send, and receive the sound signal so as to achieve, for example, the TOF based distance measurement; an inertial sensor U4 configured to obtain the inertial sensor data of the node 300; a timer U5 configured to record the signal sending and receipt time points so as to achieve the TOF based distance measurement algorithm; a storage part U6 configured to store the relevant data such as the node ID information (including the master node ID information and/or the slave node ID information), the inertial sensor data, and the signal sending and receipt time points; and a power supply U7 configured to provide electricity.

Of course, the above-described hardware structure is just an example; that is, the present invention is not limited to this.

The wireless network establishment part U2 is configured to send a radio signal for establishing the wireless network. In other words, the wireless network establishment U2 is in charge of establishing the wireless network. All the mobile devices (nodes) in a same wireless network have a same role (e.g., may be slave nodes in the initial stage) at the beginning. When a node needs to localize the other nodes, it may become a master node, and then, may start a localization process, and at the same time, the other nodes are still slave nodes. After finishing the localization process, the master node may become a slave node again. In an actual application of the mobile device, the wireless network technology may be a WI-FI, Bluetooth, or BLE related one.

The sound signal sent and received by the sound signal processing part U3 is hearable. Of course, the sound signal may also be an ultrasonic signal or a sound signal whose frequency is lower than that of the hearable sound signal (i.e., infrasound, sometimes referred to as low-frequency sound). In an actual application of the mobile device 300, the sound signal may be based on a speaker and a microphone thereof in general. In order to avoid the interference due to environmental noise or an obstacle, it is preferred to use a sound signal whose frequency is within a range of 20 Hz to 30 Hz.

Here the timer U5 may also be realized in the processing part U1 in a manner of software.

In addition, the relative positioning apparatus 200 shown in FIG. 14 may communicate with the mobile device 300 shown in FIG. 15 by utilizing any proper way, as long as the mobile device 300 may include the function of the relative positioning device 200.

In an example, the relative positioning device 200 shown in FIG. 14 may be mounted in the mobile device 300 as a software based module and/or a hardware based module. In other words, the mobile device 300 may include the relative positioning device 200. For example, the mobile device 300 may be a cellular phone, and the relative positioning device 200 may be a software based module in the operating system of the cellular phone, or an application program developed for the cellular phone. Of course, the relative positioning device 200 may also be one of the plural hardware based modules of the cellular phone.

Alternatively, in another example, the relative positioning device 200 shown in FIG. 14 and the mobile device 300 may be separate. In this case, the relative positioning device 200 may be connected to the mobile device 300 via a wired and/or wireless network.

Here it should be noted that the above respective embodiments are just exemplary ones, and the specific structure and operation of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201510065579.4 filed on Feb. 9, 2015, the entire contents of which are hereby incorporated by reference.

What is claimed is:

1. A method, comprising:
obtaining inertial sensor data of first and second mobile devices, the first mobile device being capable of sending a first signal to the second mobile device;
obtaining a sending frequency that the first signal has when the first mobile device sends the first signal to the second mobile device;
obtaining a receipt frequency that the first signal has when the second mobile device receives the first signal sent from the first mobile device, the first signal receiving influence of a Doppler effect in a sending process in which the first signal is sent to the second mobile device from the first mobile device;
determining a type of the Doppler effect based on a magnitude relation between the sending frequency and the receipt frequency;
calculating, according to the determined type of the Doppler effect and based on the inertial sensor data, the sending frequency, and the receipt frequency, a relative orientation angle between the first and second mobile devices, the relative orientation angle being an angle between a device orientation of one mobile device of the first and second mobile devices and a straight-line direction along a straight line from the one mobile device to another mobile device of the first and second mobile devices; and
determining, based on the calculated relative orientation angle and a relative distance between the first and second mobile devices, a relative positional relation between the first and second mobile devices.

2. The method according to claim 1, wherein calculating the relative orientation angle includes:
calculating, based on the inertial sensor data, a first moving velocity component of the first mobile device in the straight-line direction and a second moving velocity component of the second mobile device in the straight-line direction;
generating, according to the determined type of the Doppler effect and based on the first and second moving velocity components, a first relation between a first relative orientation angle of the first mobile device relative to the second mobile device and a second relative orientation angle of the second mobile device relative to the first mobile device, wherein the determined type of the Doppler effect is one of a first type and a second type, the first type indicating that the first and second mobile devices approach each other, the second type indicating that that the first and second mobile devices depart from each other;
generating, based on a first device orientation of the first mobile device and a second device orientation of the second mobile device, a second relation between the first relative orientation angle and the second relative orientation angle; and
solving for, based on the first and second relations, at least one of the first relative orientation angle and the second relative orientation angle.

3. A relative positioning method of a mobile device, comprising:
calculating, by adopting the method of claim 1, an initial relative orientation angle between the first and second mobile devices;
calculating an initial relative distance between the first and second mobile devices; and
determining, based on the initial relative orientation angle and the initial relative distance, an initial relative positional relation between the first and second mobile devices.

4. The relative positioning method according to claim 3, wherein calculating the initial relative distance includes:
obtaining a sending end time point of the first signal sent by the first mobile device;
obtaining a receipt start time point of a second signal received by the first mobile device, the second signal being sent to the first mobile device by the second mobile device after the second mobile device receives the first signal;
obtaining a processing time delay in a process where the second mobile device processes the first signal to get a processing result, generates the second signal based on the processing result, and sends the second signal; and
calculating the initial relative distance based on at least the sending end time point, the receipt start time point, the processing time delay, and propagation velocities of the first and second signals.

5. The relative positioning method according to claim 4, wherein obtaining the receipt start time point of the second signal received by the first mobile device includes:
obtaining the receipt start time point in response to determining that ID information analyzed from the second signal by the first mobile device includes ID information of the first mobile device.

6. The relative positioning method according to claim 4, wherein:
the first signal includes ID information of the first mobile device represented by different changes of plural sending frequencies; and the second signal includes ID information of the first and second mobile devices represented by different changes of plural sending frequencies.

7. The relative positioning method according claim 3, further comprising:
re-obtaining, after determining the initial relative positional relation, the inertial sensor data of the first and second mobile devices, and calculating, based on the re-obtained inertial sensor data, an updated relative orientation angle between the first and second mobile devices;
calculating, based on the initial relative distance and the re-obtained inertial sensor data, an updated relative distance between the first and second mobile devices; and
estimating, based on the updated relative orientation angle and the updated relative distance, an updated relative positional relation between the first and second mobile devices.

8. The relative positioning method according to claim 7, further comprising:
calculating, after estimating the updated relative positional relation, an accumulated error related to the updated relative positional relation;
determining whether the accumulated error is greater than or equal to a predetermined threshold; and
re-calculating, in response to determining that the accumulated error is greater than or equal to the predetermined threshold, the initial relative orientation angle and the initial relative distance between the first and second mobile devices.

9. A non-transitory machine-readable medium storing machine-executable instructions for execution by a processing system, wherein the machine-executable instructions, when executed, cause the processing system to carry out the method of claim 1.

10. A device, comprising:
a processor; and
a memory coupled to the processor storing executable instructions, which when executed by the processor, configure the processor to,
obtain inertial sensor data of first and second mobile devices, the first mobile device being capable of sending a first signal to the second mobile device;
obtain a sending frequency that the first signal has when the first mobile device sends the first signal to the second mobile device;
obtain a receipt frequency that the first signal has when the second mobile device receives the first signal sent from the first mobile device, the first signal receiving influence of a Doppler effect in a sending process in which the first signal is sent to the second mobile device from the first mobile device;
determine a type of the Doppler effect based on a magnitude relation between the sending frequency and the receipt frequency;
calculate, according to the determined type of the Doppler effect and based on the inertial sensor data, the sending frequency, and the receipt frequency, a relative orientation angle between the first and second mobile devices, the relative orientation angle being an angle between a device orientation of one mobile device of the first and second mobile devices and a straight-line direction along a straight line from the one mobile device to another mobile device of the first and second mobile devices; and
determine, based on the calculated relative orientation angle and a relative distance between the first and second mobile devices, a relative positional relation between the first and second mobile devices.

11. The device according to claim 10, wherein the executable instructions when executed further configure the processor to:
calculate, based on the inertial sensor data, a first moving velocity component of the first mobile device in the straight-line direction and a second moving velocity component of the second mobile device in the straight-line direction;
generate, according to the determined type of the Doppler effect and based on the first and second moving velocity components, a first relation between a first relative orientation angle of the first mobile device relative to the second mobile device and a second relative orientation angle of the second mobile device relative to the first mobile device, wherein the determined type of the Doppler effect is one of a first type and a second type, the first type indicating that the first and second mobile devices approach each other, the second type indicating that that the first and second mobile devices depart from each other;
generate, based on a first device orientation of the first mobile device and a second device orientation of the second mobile device, a second relation between the first relative orientation angle and the second relative orientation angle; and
solve for, based on the first and second relations, at least one of the first relative orientation angle and the second relative orientation angle.

12. The device according to claim 10, wherein the executable instructions when executed further configure the processor to:
calculate an initial relative orientation angle between the first and second mobile devices;
calculate an initial relative distance between the first and second mobile devices, wherein calculating the initial relative distance includes
obtaining a sending end time point of the first signal sent by the first mobile device,
obtaining a receipt start time point of a second signal received by the first mobile device, the second signal being sent to the first mobile device by the second mobile device after the second mobile device receives the first signal,
obtaining a processing time delay in a process where the second mobile device processes the first signal to get a processing result, generates the second signal based on the processing result, and sends the second signal, and
calculating the initial relative distance based on at least the sending end time point, the receipt start time point, the processing time delay, and propagation velocities of the first and second signals; and
determine, based on the initial relative orientation angle and the initial relative distance, an initial relative positional relation between the first and second mobile devices.

13. The device according to claim 12, wherein the executable instructions when executed further configure the processor to:
re-obtain, after determining the initial relative positional relation, the inertial sensor data of the first and second mobile devices, and calculate, based on the re-obtained inertial sensor data, an updated relative orientation angle between the first and second mobile devices;

calculate, based on the initial relative distance and the re-obtained inertial sensor data, an updated relative distance between the first and second mobile devices;

estimate, based on the updated relative orientation angle and the updated relative distance, an updated relative positional relation between the first and second mobile devices;

calculate, after estimating the updated relative positional relation, an accumulated error related to the updated relative positional relation;

determine whether the accumulated error is greater than or equal to a predetermined threshold; and re-calculate, in response to determining that the accumulated error is greater than or equal to the predetermined threshold, the initial relative orientation angle and the initial relative distance between the first and second mobile devices.

* * * * *